United States Patent
Bhamidipati et al.

(10) Patent No.: US 11,182,390 B2
(45) Date of Patent: Nov. 23, 2021

(54) CONTENT ITEM SELECTION

(71) Applicant: Oath Inc., New York, NY (US)

(72) Inventors: Lakshmi Narayan Bhamidipati, Sunnyvale, CA (US); Ravi Kant, San Jose, CA (US); Yohay Kaplan, Tel-Aviv (IL); Alexander Shtof, Haifa (IL)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/731,108

(22) Filed: Dec. 31, 2019

(65) Prior Publication Data

US 2021/0200774 A1 Jul. 1, 2021

(51) Int. Cl.
  *G06F 17/10* (2006.01)
  *G06F 16/2457* (2019.01)
  *G06F 16/248* (2019.01)

(52) U.S. Cl.
  CPC ...... *G06F 16/24575* (2019.01); *G06F 16/248* (2019.01)

(58) Field of Classification Search
  CPC .................. G06F 16/24575; G06F 16/248
  See application file for complete search history.

(56) References Cited

U.S. PATENT DOCUMENTS

| | | | | |
|---|---|---|---|---|
| 9,305,098 | B1 * | 4/2016 | Willingham | G06Q 30/0242 |
| 10,372,768 | B1 * | 8/2019 | Lewis | G06F 16/48 |
| 2011/0082756 | A1 * | 4/2011 | Eisnor | G06Q 30/02 |
| | | | | 705/14.69 |
| 2011/0246267 | A1 * | 10/2011 | Williams | G06Q 30/08 |
| | | | | 705/14.4 |
| 2011/0307328 | A1 * | 12/2011 | Crites | G06Q 30/0201 |
| | | | | 705/14.45 |
| 2016/0155143 | A1 * | 6/2016 | Hsiao | G06Q 30/0283 |
| | | | | 705/14.45 |
| 2017/0091811 | A1 * | 3/2017 | Saxena | G06Q 30/0247 |
| 2018/0025379 | A1 * | 1/2018 | Hewinson | G06Q 30/0244 |
| | | | | 705/14.43 |
| 2018/0040003 | A1 * | 2/2018 | Scharf | G06Q 30/0201 |
| 2018/0260715 | A1 * | 9/2018 | Yan | G06N 5/02 |
| 2019/0278378 | A1 * | 9/2019 | Yan | G06Q 30/0242 |
| 2020/0273095 | A1 * | 8/2020 | Koren | G06Q 30/08 |

* cited by examiner

*Primary Examiner* — Shahid K Khan
(74) *Attorney, Agent, or Firm* — Cooper Legal Group, LLC

(57) ABSTRACT

One or more computing devices, systems, and/or methods for selecting content items for presentation via client devices are provided. A content event associated with a content item performed by a client device may be detected. The content item may be associated with an entity. A conversion event, associated with the entity, performed by the client device may be detected. A duration of time between the content event and the conversion event may be determined. An attribution score may be determined based upon the duration of time. A plurality of attribution scores, comprising the attribution score, may be stored in an attribution data structure associated with the content item. Responsive to receiving a request for content associated with a second client device, the content item may be selected from a plurality of content items for presentation via the second client device based upon the attribution data structure.

20 Claims, 15 Drawing Sheets

CONTENT ITEM SELECTION

BACKGROUND

Many applications, such as websites, applications, etc. may provide platforms for viewing media. For example, a user may interact with a service, where the service may use user information associated with the user to determine interests of the user. For example, media may be selected for the user based upon the interests of the user.

SUMMARY

In accordance with the present disclosure, one or more computing devices and/or methods are provided. In an example, a first content event performed by a first client device may be detected. The first content event may be associated with a first content item. The first content item may be associated with a first entity. A first conversion event performed by the first client device may be detected. The first conversion event may be associated with the first entity. A first duration of time between the first content event and the first conversion event may be determined based upon the first content event and the first conversion event. A first attribution score associated with the first content event may be determined based upon the first duration of time. A first plurality of attribution scores, comprising the first attribution score, may be stored in a first attribution data structure associated with the first content item. An attribution score of the first plurality of attribution scores may be associated with a content event associated with the first content item and/or a conversion event associated with the first entity. A first request for content associated with a second client device may be received. Responsive to receiving the first request for content, the first content item may be selected, from a first plurality of content items, for presentation via the second client device based upon the first attribution data structure. The first content item may be transmitted to the second client device.

In an example, a first content event performed by a first client device associated with a first user profile may be detected. The first content event may be associated with a first content item. The first content item may be associated with a first entity. A first conversion event performed by a second client device associated with the first user profile may be detected. The first conversion event may be associated with the first entity. A first duration of time between the first content event and the first conversion event may be determined based upon the first content event and the first conversion event. A first attribution score associated with the first content event may be determined based upon the first duration of time. A first plurality of attribution scores, comprising the first attribution score, may be stored in a first attribution data structure associated with the first content item. An attribution score of the first plurality of attribution scores may be associated with a content event associated with the first content item and/or a conversion event associated with the first entity. A first request for content associated with a third client device may be received. Responsive to receiving the first request for content, the first content item may be selected, from a first plurality of content items, for presentation via the third client device based upon the first attribution data structure. The first content item may be transmitted to the third client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
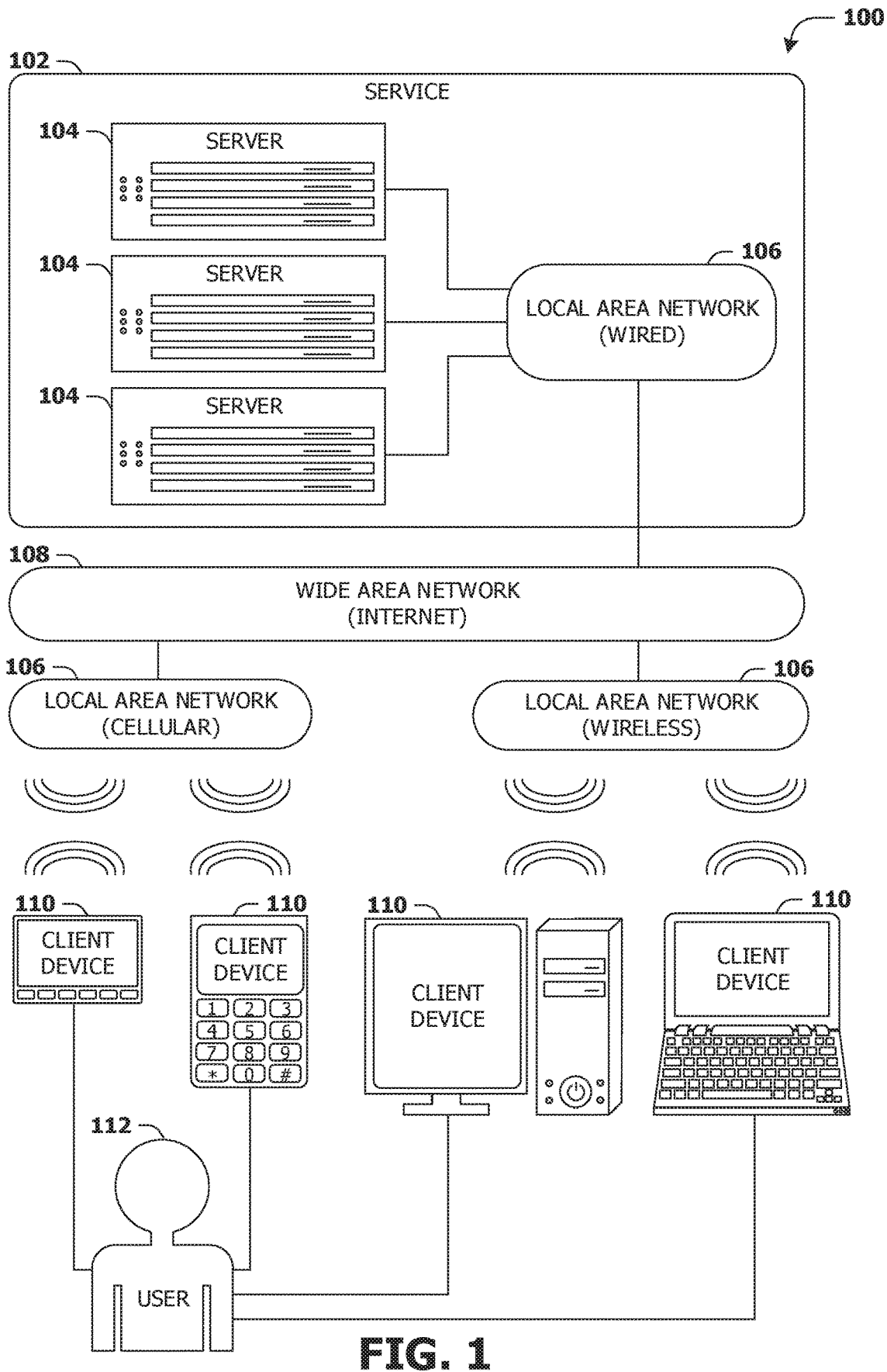
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
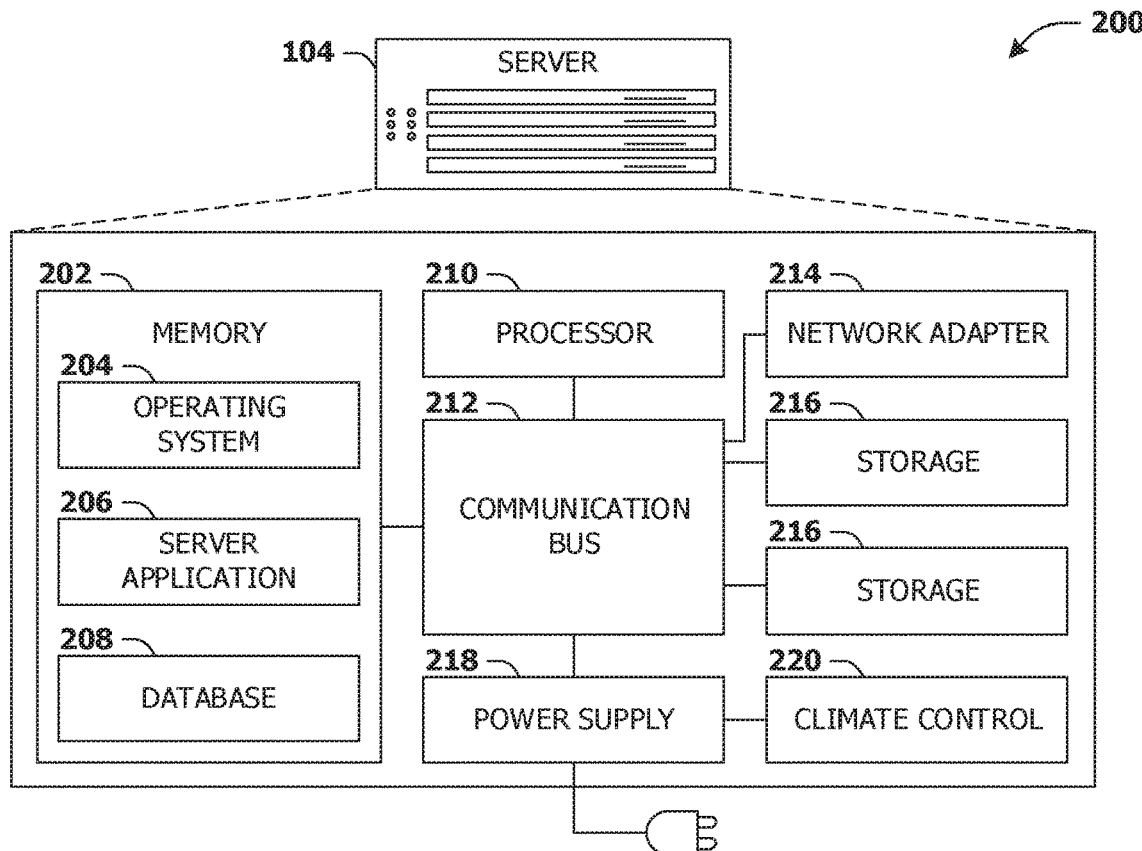
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
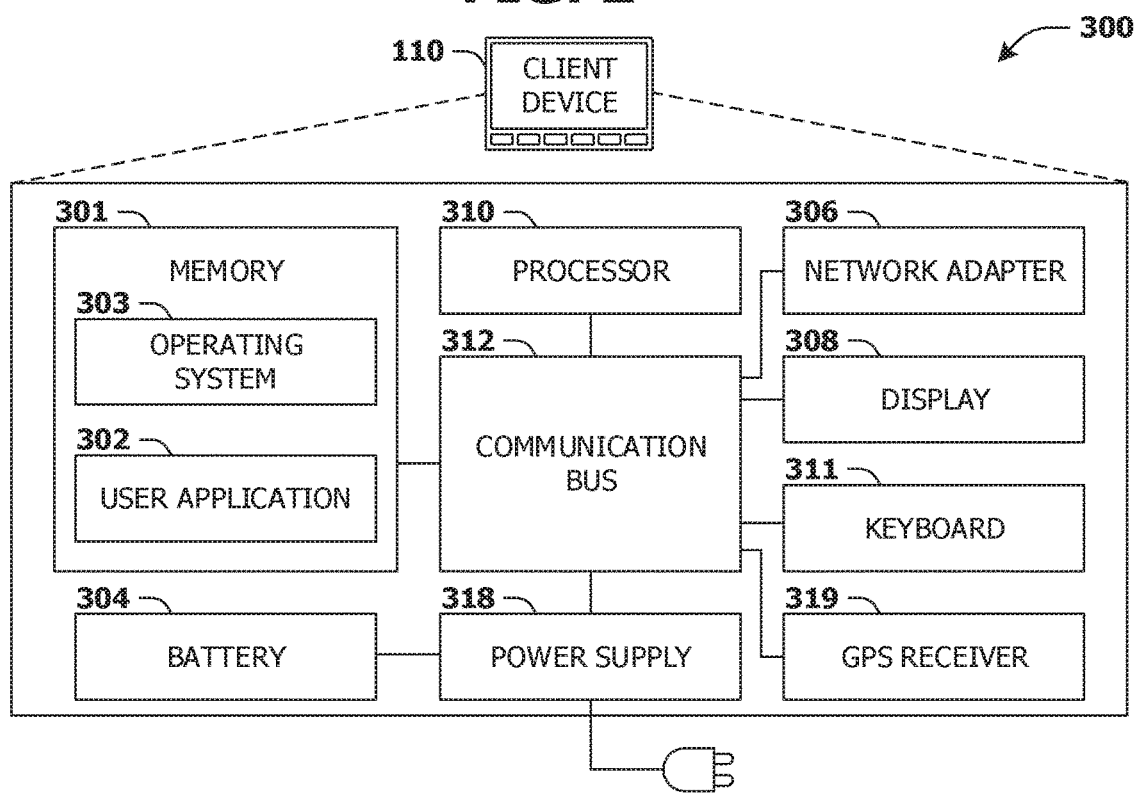
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for selecting content for transmission to devices are provided. For example, a user (and/or a device associated with the user) may access and/or interact with a service, such as a browser, software, a website, an application, an operating system, etc. that provides a platform for viewing and/or downloading content from a server associated with a content system. In some examples, the content system may use device information, such as one or more of activity information (e.g., search history information, website browsing history, email information, etc.), user demographic information, location information, etc. to determine interests of the user. For example, the device information may be received from the device (and/or one or more other devices associated with the user and/or a user account associated with the user). Alternatively and/or additionally, the user information may be received from servers associated with websites visited by the user, servers associated with an email account of the user, etc.

In an example, the content system may provide a first content item (e.g., an advertisement, an image, a video, etc.) for presentation via a plurality of client devices. The first content item may be associated with a first entity. For example, the first content item may be associated with cars and/or the first entity may be a first advertiser associated with a car brand. A set of conversion events associated with a set of client devices of the plurality of client devices may be detected. In some systems, the set of conversion events may be attributed to presentation of the first content item via the set of client devices of the plurality of client devices. For example, attribution of the set of conversion events to presentation of the first content item via the set of client devices may correspond to a determination (and/or a prediction) that the first set of conversion events occurred as a result of the presentation of the first content item via the set of client devices. The first content item may be selected for presentation via a client device based upon the attribution of the set of conversion events to presentation of the first content item via the set of client devices.

However, the attribution of the set of conversion events to presentation of the first content item via the set of client devices may not be accurately performed. For example, the attribution of the set of conversion events to presentation of the first content item may be performed without taking into account a duration of time between presentation of the first content item and a conversion event, a platform with which the first content item is presented, a type of device used to present the first content item, user behavior and/or one or more demographics of a user associated with presentation of the first content item, etc. Alternatively and/or additionally, the attribution of the set of conversion events to presentation of the first content item may be performed based upon a determination that a conversion event of the set of conversion events occurs within an attribution time window after presentation of the first content item, which leads to not attributing a conversion event to presentation of the first content item in cases where presentation of the first content item influences a user to perform the conversion event.

Accordingly, due to inaccurately attributing the set of conversion events to presentation of the first content item, a probability that the client device performs a conversion event associated with the first entity after presenting the first content item may be different than a determined probability (e.g., a probability that is determined based upon the attribution of the set of conversion events to presentation of the first content item via the set of client devices).

Thus, in accordance with one or more of the techniques presented herein, a first content event performed by a first client device may be detected. The first content event may be associated with a first content item. The first content item may be associated with a first entity. The first content event may correspond to presentation of the first content item via the first client device. Alternatively and/or additionally, the first content event may correspond to a selection of the first content item via the first client device (while the first content item is presented via the first client device). A first conversion event, performed by the first client device, associated with the first entity may be detected. A first duration of time between the first content event and the first conversion event may be determined. A first attribution score may be determined based upon the first duration of time. Alternatively and/or additionally, the first attribution score may be determined based upon first device information (e.g., user information, historical activity, a type of client device, a platform, etc.) associated with the first client device. In some examples, a first plurality of attribution scores, comprising the first attribution score, may be stored in a first attribution data structure associated with the first content item. A request for content associated with a second client device may be received. The first content item may be selected from a first plurality of content items for presentation via the second client device based upon the first attribution data structure. In an example, the first plurality of attribution scores may be associated with a first plurality of sets of device information. A first conversion score associated with the second client device and/or the first content item may be determined based upon the first plurality of attribution scores, the first plurality of sets of device information and/or the second device information associated with the second client device. The first content item may be selected for presentation via the second client device based upon the first conversion score. The first conversion score may be indicative of a probability of the second client device performing a second conversion event after presenting the first content item via the second client device.

Figure 4:
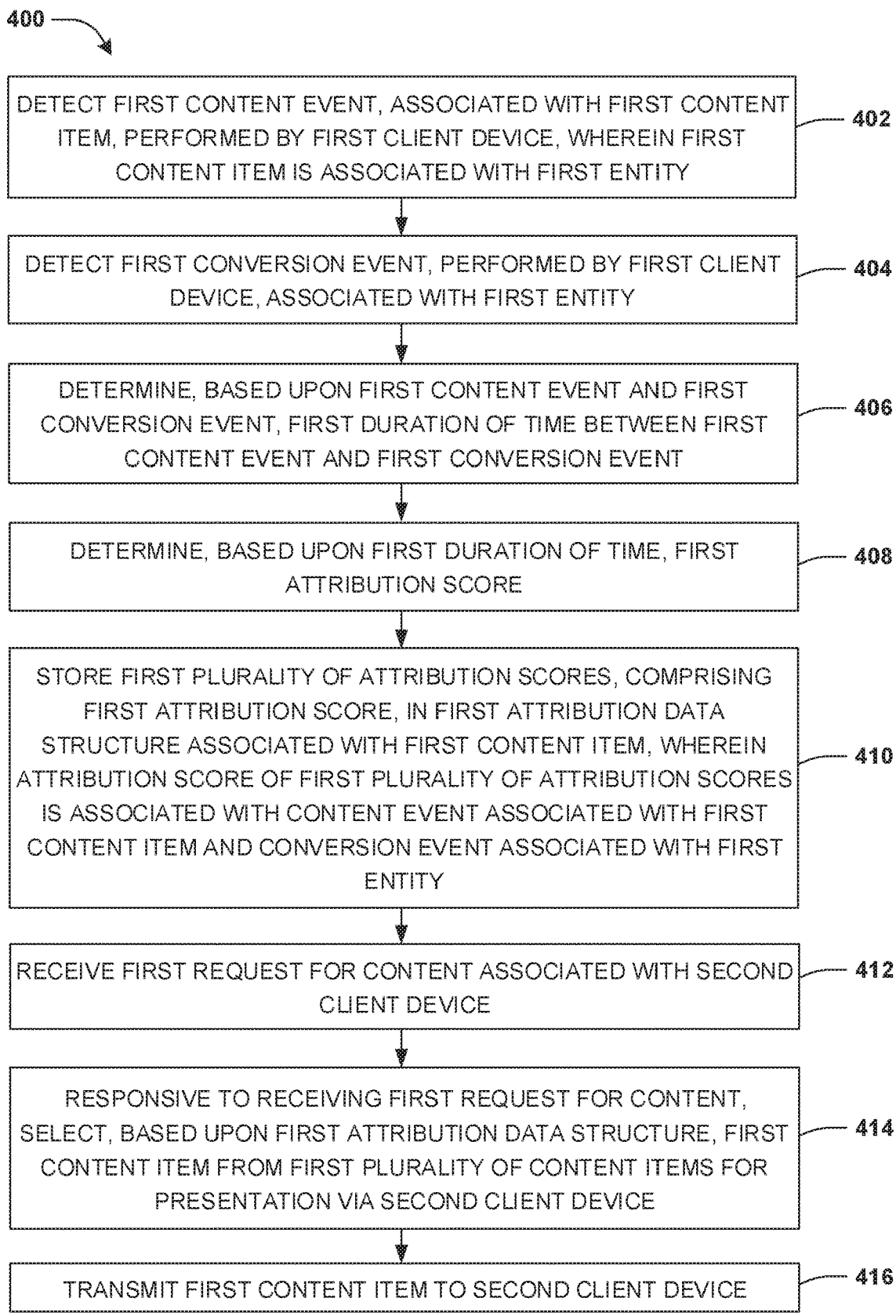
FIG. 4 is a flow chart illustrating an example method for selecting content for presentation via devices.

An embodiment of selecting content for transmission to devices is illustrated by an example method 400 of FIG. 4. A content system for presenting content via client devices may be provided. In some examples, the content system may be an advertisement system (e.g., an online advertising system). Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, the content system may generate and/or maintain a user profile database comprising a plurality of user profiles associated with the plurality of client devices and/or a plurality of user accounts (e.g., email accounts, messaging accounts, content platform accounts for uploading content and/or for consuming articles, videos and/or music, etc.) associated with the content system. A user profile of the plurality of user profiles may comprise an identifier that identifies the user profile, a client device associated with the user profile and/or a user account associated with the user profile. Alternatively and/or additionally, a user profile of the plurality of user profiles may comprise demographic information, such as an age (and/or age range), family size, gender, occupation, income, and/or other demographic information. Alternatively and/or additionally, a user profile of the plurality of user profiles may comprise activity information associated with a client device and/or a user account. For example, the activity information may be indicative of at least one of one or more consumed content items (e.g., a consumed content item may correspond to at least one of an article, a video, an audio file, an image, a web page, an advertisement, an email, a message, etc. consumed by a user), one or more accessed content items, one or more selected content items, one or more content item interactions (e.g., an advertisement impression, an advertisement click, etc.), etc.

In some examples, a first entity may access and/or interact with a service, such as an advertising service, that provides a platform for uploading, to the content system, content to be presented via client devices. In some examples, the first entity may be an advertiser, a company, a brand, an organization, etc. One or more content items (e.g., one or more advertisements) associated with the first entity may be received from a device associated with the first entity. The one or more content items may be associated with one or more products, one or more services, etc. associated with the first entity. For example, the first entity may upload, to the content system, the one or more content items. The one or more content items may be associated with a content campaign for promoting the one or more products and/or the one or more services associated with the first entity. Alternatively and/or additionally, content information associated with the content campaign may be received from the device associated with the entity. For example, the content information may comprise one or more of a first budget associated with the content campaign, a first target spend pattern associated with the content campaign, a duration of time for which the one or more content items shall be presented by the content system, one or more campaign goals associated with the content campaign and/or the one or more content items (e.g., the one or more campaign goals may correspond to a number of impressions associated with the one or more content items, a number of interactions associated with the one or more content items, a number of conversion events performed as a result of the content campaign, etc.), etc. In some examples, a first content item associated with the content campaign may be presented via client devices associated with the content system.

A first user, such as user Jill, and/or a first client device associated with the first user may access and/or interact with a service, such as a browser, software, a website, an application, an operating system, an email interface, a messaging interface, a music-streaming application, a video application, a news application, etc. that provides a platform for viewing and/or downloading content from a server associated with the content system. In some examples, the content system may select content for presentation to the first user based upon a first user profile comprising activity information (e.g., search history information, website browsing history, email information, selected content items, etc.), demographic information associated with the first user, location information, etc.

At 402, a first content event performed by the first client device may be detected. The first content event may be associated with the first content item. In some examples, the first content event may correspond to the first content item being presented via the first client device. Alternatively and/or additionally, the first content event may correspond to a selection of the first content item via the first client device.

In some examples, prior to the first content event, a first request for content associated with the first client device may be received. The first request for content may be received responsive to the first client device accessing a first internet resource associated with the content system (e.g., one or more of a web page of a website associated with the content system, an application associated with the content system, an internet game associated with the content system, etc.). For example, the first client device may transmit a request to access the first internet resource to a first server associated with the first internet resource. Responsive to receiving the request to access the first internet resource, the first server associated with the first internet resource may transmit the first request for content to the content system (and/or to a second server associated with the content system). Alternatively and/or additionally, the first request for content may be received from the first client device. In some examples, the first request for content may correspond to a request to be provided with a content item (e.g., an advertisement, an image, a link, a video, etc.) for presentation via the first internet resource.

In some examples, responsive to receiving the first request for content, a bidding process may be performed to select a content item from a first plurality of content items participating in an auction (e.g., an auction for selection of a content item to present via the first client device). In some examples, the first plurality of content items (participating in the auction) may comprise the first content item.

In some examples, a first plurality of bid values associated with the first plurality of content items may be determined. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items. In some examples, the first plurality of bid values may comprise a first bid value associated with the first content item.

In some examples, the first content item may be selected from the first plurality of content items for presentation via the first client device based upon the first plurality of bid values. For example, the first content item may be selected from the first plurality of content items based upon a determination that the first bid value associated with the first content item exceeds a threshold bid value. Alternatively and/or additionally, the first content item may be selected from the first plurality of content items based upon a determination that the first bid value is greater than one or more other bid values of the first plurality of bid values. Alternatively and/or additionally, the first content item may be selected from the first plurality of content items based upon a determination that the first bid value is a highest bid value of the first plurality of bid values.

Alternatively and/or additionally, a first plurality of content item scores associated with the first plurality of content items may be determined. For example, the first plurality of content items scores may be determined based upon the first plurality of bid values and/or a first plurality of click probabilities associated with the first plurality of content items. The first plurality of click probabilities may be determined based upon content item information associated with the first plurality of content items and/or the first user profile associated with the first client device. In some examples, a click probability of the first plurality of click probabilities may correspond to a probability of receiving a selection of a content item responsive to presenting the content item via the first client device. Alternatively and/or additionally, a click probability of the first click probabilities may correspond to a probability of receiving a positive signal responsive to presenting a content item via the first client device. For example, the positive signal may be indicative of the content item being consumed by the first user. Alternatively and/or additionally, the positive signal may be indicative of one or more user interactions with the content item. Alternatively and/or additionally, the positive signal may be indicative of the content item being presented (and/or the content item being presented for longer than a threshold duration of time) via the first client device.

In some examples, the first content item may be selected from the first plurality of content items for presentation via the first client device based upon the first plurality of content item scores. For example, the first content item may be selected from the first plurality of content items based upon a determination that a first content item score associated with the first content item exceeds a threshold content item score. Alternatively and/or additionally, the first content item may be selected from the first plurality of content items based upon a determination that the first content item score is greater than one or more other content item scores of the first plurality of content item scores. Alternatively and/or additionally, the first content item may be selected from the first plurality of content items based upon a determination that the first content item score is a highest content item score of the first plurality of content item scores.

In some examples, the first content item may be transmitted to the first client device responsive to selecting the first content item for presentation via the first client device. The first content item may be presented via the first client device. For example, the first content item may be presented via the first internet resource on the first client device, such as while the first internet resource is accessed and/or displayed.

In some examples, the first content event may be detected by determining that the first content item is presented via the first client device. For example, a first content event indication, indicative of the first content event, may be stored responsive to determining that the first content item is presented via the first client device. Alternatively and/or additionally, the first content event may be detected by determining that at least a threshold proportion of the first content item is presented and/or displayed via the first client device (e.g., the threshold proportion may correspond to 50% of the first content item and/or a different proportion of the first content item). For example, the first content event indication may be stored responsive to determining that a portion of the first content item that is displayed via the first client device meets the threshold proportion. Alternatively and/or additionally, the first content event indication may not be stored responsive to a determining that a portion of the first content item that is displayed via the first client device does not meet the threshold proportion.

In some examples, the first content event may be detected by detecting a selection of the first content item via the first client device. For example, the first content event indication may be stored responsive to receiving a message, indicative of the selection of the first content item, from the first client device (and/or from a server associated with the first internet resource and/or the first content item). In some examples, a web page associated with the first entity may be accessed and/or presented by the first client device responsive to the selection of the first content item.

In some examples, the first content event may be detected by receiving a positive signal associated with the first content item. For example, the positive signal may be indicative of the first content item being consumed by the first user. Alternatively and/or additionally, the positive signal may be indicative of one or more user interactions with the first content item. For example, the one or more user interactions may correspond to a mouse cursor overlaying the first content item (and/or the mouse cursor hovering over and/or adjacent to the first content item). Alternatively and/or additionally, in an example where the first client device comprises a touchscreen display, the one or more user interactions may correspond to one or more objects (e.g., a finger, a touchscreen stylus and/or a different object) positioned on the first content item and/or one or more movements of the one or more objects (e.g., a swiping motion of the finger and/or the touchscreen stylus). Alternatively and/or additionally, the positive signal may be indicative of the first content item being presented and/or displayed via the first client device for longer than a threshold duration of time. In some examples, the first content event indication may be stored responsive to receiving the positive signal from the first client device (and/or from a server associated with the first internet resource).

In some examples, the first content event indication may be indicative of at least one of the first content item (e.g., the first content event indication may comprise a content item identifier that identifies the first content item), a first time that the first content event occurs, a first type of client device used to present the first content item (e.g., a type of client device of the first client device, such as at least one of a computer, a phone, a smartphone, a laptop, a tablet, a wearable device, a different type of client device, etc.), a first platform used by the first client device to access the first content item (e.g., a program, such as at least one of a browser, an email application, a news application, a multimedia application, etc.), the first internet resource (e.g., the first content event indication may comprise a web address associated with the first internet resource), etc.

At 404, a first conversion event performed by the first client device may be detected. The first conversion event may be associated with the first entity.

In some examples, the first conversion event associated with the first entity may be determined by analyzing first activity associated with the first client device. In some examples, the first conversion event may correspond to at least one of a purchase of a product of one or more products associated with the first entity, a purchase of a service of one or more services associated with the first entity, subscribing to (and/or signing up for) a service associated with the first entity, contacting the first entity (e.g., contacting the first entity via one or more of email, phone, etc.), a selection of a content item associated with the first entity, an interaction with a content item associated with the first entity, accessing a web page associated with the first entity, adding a product and/or a service associated with the first entity to a shopping cart on an online shopping platform, completing a form (e.g., a survey form), creating and/or registering an account (e.g., a user account) for a platform associated with the first entity (e.g., creating a shopping user account for an online shopping platform), downloading an application (e.g., a mobile application) associated with the first entity onto the first client device and/or installing the application on the first client device, opening and/or interacting with the application, utilizing one or more services associated with the first entity using the application, etc.

In some examples, conversion identification information may be retrieved from a database and/or may be received from a device associated with the first entity. The conversion identification information may be indicative of one or more actions that correspond to an occurrence of a conversion event with respect to the first entity and/or the content campaign. For example, the conversion identification information may be indicative of a set of actions, wherein an action of the set of actions constitutes a conversion event. In an example, the set of actions may comprise at least one of a purchase of a product of the one or more products associated with the first entity, a purchase of a service of the one or more services associated with the first entity, subscribing to (and/or signing up for) a service of the one or more services associated with the first entity, contacting the first entity, a selection of a content item associated with the first entity, an interaction with a content item associated with the first entity, accessing a web page associated with the first entity, adding a product and/or a service associated with the first entity to a shopping cart on an online shopping platform, completing a form, creating and/or registering an account for a platform associated with the first entity, downloading an application associated with the first entity onto the first client device and/or installing the application on the first client device, opening and/or interacting with the application, utilizing one or more services associated with the first entity using the application, etc.

Alternatively and/or additionally, the conversion identification information may comprise one or more sequences of actions. For example, a sequence of actions of the one or more sequences of actions may correspond to an occurrence of a conversion event (with respect to the first entity and/or the content campaign). Accordingly, it may be determined that activity associated with the first client device constitutes a conversion event associated with the first entity responsive to a determination that each action of the sequence of actions is performed.

For example, a sequence of actions of the one or more sequences of actions may comprise a first action, such as downloading an application associated with the first entity, and a second action, such as utilizing one or more services associated with the first entity using the application. Alternatively and/or additionally, the sequence of actions may comprise one or more other actions.

In an example where the first entity is associated with a shopping service, a first sequence of actions of the one or more sequences of actions may comprise a first action, such as downloading an application associated with the shopping service (e.g., a shopping mobile application), and a second action, such as performing a purchase of a product using the application.

In an example where the first entity is associated with a ride-share service, a first sequence of actions of the one or more sequences of actions may comprise a first action, such as downloading a customer application (e.g., a ride-share service mobile application for customers), and a second action, such as utilizing services of the ride-share service (such as using the application for transportation by requesting that a driver take the first user from a first location to a second location). Alternatively and/or additionally, a second sequence of actions of the one or more sequences of actions may comprise a third action, such as downloading a driver application (e.g., a ride-share service mobile application for drivers), and a second action, such as requesting a background check and/or uploading one or more documents via the driver application for performance of the background check.

In some examples, the first activity associated with the first client device may be analyzed based upon the conversion identification information to determine the first conversion event. For example, the first conversion event may be identified and/or determined by detecting activity performed by the first client device (and/or by a different client device associated with the first user) that comprises an action of the first set of actions that constitutes a conversion event. Alternatively and/or additionally, the first conversion event may be identified and/or determined by detecting activity performed by the first client device (and/or by a different client device associated with the first user) that comprises each action of a sequence of actions that constitutes a conversion event.

Alternatively and/or additionally, the first user profile associated with the first client device may be analyzed to determine the first conversion event. For example, the first user profile may be indicative of the first activity associated with the first client device. The first user profile may be analyzed based upon the conversion identification information to determine the first conversion event. For example, the first conversion event may be identified and/or determined by identifying, within the first user profile, an indication of a selection of a content item associated with the first entity. Alternatively and/or additionally, the first conversion event may be identified and/or determined by identifying, within the first user profile, an indication of an interaction with a content item associated with the first entity. Alternatively and/or additionally, the first conversion event may be identified and/or determined by identifying, within the first user profile, an indication of a web page associated with the first entity being accessed. Alternatively and/or additionally, the first conversion event may be identified and/or determined by identifying, within the first user profile, an indication of a purchase of a product and/or a service associated with the first entity. Alternatively and/or additionally, the first conversion event may be identified and/or determined by identifying, within the first user profile, an indication of a subscription to a service associated with the first entity. Alternatively and/or additionally, the first conversion event may be identified and/or determined by identifying, within the first user profile, an indication of a product and/or a service associated with the first entity being added to a shopping cart on an online shopping platform. Alternatively and/or additionally, the first conversion event may be identified and/or determined by identifying, within the first user profile, an indication of a form associated with the first entity being completed (and/or submitted), such as one or more of a survey form, a questionnaire, an application, a request for a quote, etc. Alternatively and/or additionally, the first conversion event may be identified and/or determined by identifying, within the first user profile, an indication of registration of an account (e.g., a user account) for a platform associated with the first entity. Alternatively and/or additionally, the first conversion event may be identified and/or determined by identifying, within the first user profile, an indication of an application associated with the first entity being downloaded onto the first client device and/or installed on the first client device (and/or the application being opened and/or interacted with via the first client device). Alternatively and/or additionally, the first conversion event may be identified and/or determined by identifying, within the first user profile, an indication of the application being used to utilize one or more services associated with the first entity.

Alternatively and/or additionally, messages (e.g., at least one of instant messages, emails, etc.) associated with the first client device may be analyzed to identify one or more exemplary messages indicative of one or more of a purchase of a product associated with the first entity (e.g., a receipt, a proof of purchase, a confirmation email, etc.), a purchase of a service associated with the first entity (e.g., a receipt, a proof of purchase, a confirmation email, etc.), a subscription to a service associated with the first entity, a confirmation indicating that the first client device and/or the first user contacted the first entity and/or signed up for a service associated with the first entity, etc. For example, the first conversion event may be determined based upon the one or more exemplary messages.

Alternatively and/or additionally, conversion information may be received from a device associated with the first entity and/or a service (e.g., a third party service) that detects conversion events. The conversion information may be indicative of one or more conversion events, associated with the first entity, performed by the first client device. The first conversion event may be determined based upon the conversion information.

In some examples, a first conversion event indication, indicative of the first conversion event, may be stored responsive to detecting the first conversion event. In some examples, the first conversion event indication may be indicative of the first conversion event and/or a second time that the first conversion event is performed.

Embodiments are contemplated where the first conversion event is performed by a second client device associated with the first user (rather than the first client device). For example, the second client device used to perform the first conversion event may be different than the first client device used to present the first content item. The second client device may be associated with the first user profile. In an example, the first client device and/or the second client device may be associated with a first user account associated with the first user. For example, the first client device and/or the second client device may be logged into the first user account. It may be determined that the second client device is associated with the first user and/or the first user profile based upon a determination that the second client device is associated with the first user account (e.g., it may be determined that the first conversion event is associated with the first content event and/or that both the first conversion event and the first content event involve the first user based upon the determination that the second client device is associated with the first user account). In another example, the first client device and/or the second client device may be connected to a network (e.g., a home network). It may be determined that the second client device is associated with the first user and/or the first user profile based upon a determination that the second client device is connected to the network (e.g., it may be determined that the first conversion event is associated with the first content event and/or that both the first conversion event and the first content event involve the first user based upon the determination that the second client device is connected to the network).

At 406, a first duration of time between the first content event and the first conversion event may be determined based upon the first content event and/or the first conversion event. The first duration of time may be determined based upon the first content event indication and the first conversion event indication. For example, the first duration of time may correspond to a duration of time between the first time that the first content event occurs and the second time that the first conversion event is performed.

At 408, a first attribution score may be determined based upon the first duration of time. In some examples, the first attribution score may correspond to a probability that the first conversion event is performed as a result of the first content event. For example, the first attribution score may correspond to a probability that performance of the first conversion event by the first user is due to the first content item being presented to the first user and/or selected by the first user via the first client device. Alternatively and/or additionally, the first attribution score may correspond to a probability that the first user was influenced by the first content item to perform the first conversion event. Alternatively and/or additionally, the first attribution score may correspond to an attribution level (e.g., an attribution strength) to which the first content event is attributed for causing performance of the first conversion event.

In an example, a higher attribution score may correspond to a higher probability that performance of the first conversion event by the first user is due to the first content item being presented to the first user and/or selected by the first user via the first client device. In the example, a lower attribution score may correspond to a lower probability that performance of the first conversion event by the first user is due to the first content item being presented to the first user and/or selected by the first user via the first client device.

In another example, a higher attribution score may correspond to a lower probability that performance of the first conversion event by the first user is due to the first content item being presented to the first user and/or selected by the first user via the first client device. In the example, a lower attribution score may correspond to a higher probability that performance of the first conversion event by the first user is due to the first content item being presented to the first user and/or selected by the first user via the first client device.

In some examples, the first duration of time may be indicative of (and/or the first duration of time may reflect) a probability that performance of the first conversion event by the first user is due to the first content item being presented to the first user and/or selected by the first user via the first client device. Alternatively and/or additionally, the first duration of time may be indicative of (and/or the first duration of time may reflect) a probability that the first user was influenced by the first content item to perform the first conversion event.

In a first example, the first duration of time may correspond to a first exemplary duration of time. The first exemplary duration of time may be indicative of (and/or the first exemplary duration of time may reflect) a first exemplary probability that performance of the first conversion event by the first user is due to the first content item being presented to the first user and/or selected by the first user via the first client device. In the first example, the first attribution score may correspond to a first exemplary attribution score based upon the first exemplary duration of time.

In a second example, the first duration of time may correspond to a second exemplary duration of time. The second exemplary duration of time may be indicative of (and/or the second exemplary duration of time may reflect) a second exemplary probability that performance of the first conversion event by the first user is due to the first content item being presented to the first user and/or selected by the first user via the first client device. In the second example, the first attribution score may correspond to a second exemplary attribution score based upon the second exemplary duration of time.

The first exemplary duration of time of the first example may exceed the second exemplary duration of time of the second example. Accordingly, the first exemplary probability of the first example may be lower than the second exemplary probability of the second example. Alternatively and/or additionally, the first exemplary attribution score of the first example may be lower than the second exemplary attribution score of the second example.

In some examples, the first attribution score may be determined by modifying an attribution value based upon the first duration of time. For example, one or more operations (e.g., mathematical operations) may be performed using the attribution value and/or the first duration of time to determine the first attribution score. The attribution value may be reduced based upon the first duration of time to determine the first attribution score.

In some examples, the attribution value may be reduced by a reduction value to determine the first attribution score. For example, the reduction value may be determined based upon the first duration of time. A higher duration of time of the first duration of time may correspond to a higher value of the reduction value. In some examples, the reduction value may be determined based upon a reduction function and/or the first duration of time. For example, the reduction function may correspond to an amount to reduce the attribution value per unit of time. In an example, the reduction function may correspond to a 0.1 reduction per week and/or the first duration of time may correspond to 2 weeks. The reduction value may be determined to be 0.2 based upon the reduction function and/or the first duration of time. Accordingly, the attribution value may be reduced by 0.2 to determine the first attribution score.

Alternatively and/or additionally, a time weight may be applied to the attribution value to determine the first attribution score. For example, the time weight may be determined based upon the first duration of time. A higher duration of time of the first duration of time may correspond to a lower weight of the time weight. In some examples, the time weight may be determined based upon a weight function. For example, one or more operations (e.g., mathematical operations) may be performed using the first duration of time and/or the weight function to determine the time weight. In some examples, one or more operations (e.g., mathematical operations) may be performed using the attribution value and the time weight to determine the first attribution score. For example, the attribution value may be multiplied by the time weight to determine the first attribution score.

In some examples, an attribution time window may be determined. The attribution time window may correspond to a window of time after a content event. In some systems, a conversion event associated with the content event may be attributed to the content event responsive to a determination that the conversion event is performed within the attribution time window (e.g., within the window of time after the content event). In some examples, the attribution time window may be determined based upon information received from a device associated with the first entity. For example, the attribution time window may be determined based upon the content information associated with the content campaign (e.g., the content information may comprise an indication of the attribution time window).

In some examples, the first duration of time may be compared with the attribution time window. Responsive to determining that the first duration of time is less than the attribution time window (e.g., the first duration of time is less than a duration of time corresponding to the attribution time window), the attribution value may not be reduced based upon the first duration of time to determine the first attribution score (e.g., the first attribution score may be equal to the attribution value). Alternatively and/or additionally, responsive to determining that the first duration of time exceeds the attribution time window, the attribution value may be reduced based upon the first duration of time to determine the first attribution score (using one or more of the techniques presented herein, such as by applying the reduction value and/or the time weight to the attribution value). Alternatively and/or additionally, responsive to determining that the first duration of time is less than the attribution time window, the attribution value may be reduced based upon the first duration of time to determine the first attribution score (using one or more of the techniques presented herein, such as by applying the reduction value and/or the time weight to the attribution value).

In some examples, whether one or more other content events (different than the first content event) associated with the first entity have been performed between the first content event and the first conversion event may be determined. For example, a content event of the one or more other content events may correspond to presentation of a content item associated with the first entity via the first client device (and/or a different client device associated with the first user). Alternatively and/or additionally, a content event of the one or more other content events may correspond to a selection of a content item associated with the first entity via the first client device (and/or a different client device associated with the first user). In some examples, a content event of the one or more other content events may be provided for presentation on the first client device by a second content system different than the content system (e.g., a different advertising system). In some examples, the one or more other content events may be identified based upon information received from a device associated with the first entity and/or a device associated with the second content system. Alternatively and/or additionally, the one or more other content events may be identified by analyzing and/or monitoring activity associated with the first client device (and/or a different client device associated with the first user) to identify activity associated with the one or more other content events. Alternatively and/or additionally, the one or more other content events may be identified by analyzing the first user profile to identify one or more indications of the one or more other content events.

In some examples, the first attribution score may be determined based upon a determination of whether the one or more other content events associated with the first entity have been performed between the first content event and the first conversion event. For example, responsive to a determination that the one or more other content events associated with the first entity have occurred between the first content event and the first conversion event, the attribution value may be reduced to determine the first attribution score.

In some examples, the first attribution score may be determined based upon first content information associated with the first content item. For example, the first content information may comprise a first content item category associated with the first content item. The first content item category may correspond to a type of content item of the first content item and/or a format and/or structure of the first content item (e.g., the first content item category may be indicative of the first content item being at least one of a video content item, an image content item, an audio content item, a native advertising content item, etc.).

In some examples, the first attribution score may be determined based upon the first content item category. For example, the first attribution score may be determined using a content item category data structure. The content item category data structure may comprise a plurality of content item categories and/or a plurality of content item category factors associated with the plurality of content item categories. In some examples, a content item category of the plurality of content item categories may correspond to a type of content item.

In some examples, a content item category factor of the plurality of content item category factors may be based upon an average duration of time between a content event associated with a content item category of the plurality of content item categories and a conversion event associated with the content event. For each content item category of the plurality of content item categories, an average duration of time, between a content event associated with the content item category and a conversion event associated with the content event, may be determined. For example, activity of client devices may be monitored and/or analyzed to identify a plurality of content events associated with a content item category of the plurality of content item categories. An exemplary content event of the plurality of content events may correspond to a content item associated with an entity (e.g., a content item provided by the content system) being presented, where the content item corresponds to a type of content item associated with the content item category. Alternatively and/or additionally, a plurality of conversion events associated with the plurality of content events may be determined. For example, the plurality of conversion events may comprise an exemplary conversion event associated with the exemplary content event (e.g., the exemplary conversion event may correspond to a purchase of a product and/or a service associated with the entity and/or a different type of conversion event associated with the entity). In some examples, a plurality of durations of time may be determined based upon the plurality of content events and/or the plurality of conversion events. In some examples, an exemplary duration of time of the plurality of durations of time may correspond to a duration of time between the exemplary content event and the exemplary conversion event. An average duration of time associated with the content item category may be determined by performing one or more operations (e.g., mathematical operations) using the plurality of durations of time. For example, the average duration of time may be determined by determining at least one of a mean, a median, a mode, etc. of the plurality of durations of time. In some examples, a content item category factor, of the plurality of content item category factors, associated with the content item category may be determined based upon the average duration of time.

In an example, a first exemplary content item category factor of the plurality of content item category factors may be associated with a first exemplary content item category (e.g., a video) and/or a second exemplary content item category factor of the plurality of content item category factors may be associated with a second exemplary content item category (e.g., a native advertisement). The first exemplary content item category may be associated with a first exemplary average duration of time between a content event associated with the first exemplary content item category and a conversion event associated with the content event. For example, when a content item associated with the first exemplary content item category is presented via a client device, a user that converts based upon the content item may perform a conversion event associated with the content item once the first exemplary average duration of time has passed from the time that the content item is presented, on average. Alternatively and/or additionally, the second exemplary content item category may be associated with a second exemplary average duration of time between a content event associated with the second exemplary content item category and a conversion event associated with the content event. In an example, the first exemplary average duration of time may be different than the second exemplary average duration of time. Accordingly, the first exemplary content item category factor may be different than the second exemplary content item category factor. In an example where the first exemplary average duration of time exceeds the second exemplary average duration of time, the first exemplary content item category factor may exceed (and/or be less than) the second exemplary content item category factor.

In some examples, the content item category data structure may be analyzed based upon the first content item category to identify a first content item category factor associated with the first content item category. In some examples, one or more operations (e.g., mathematical operations) may be performed using the first content item category factor and/or the first duration of time to determine the first attribution score. In an example, an initial attribution score may be determined based upon the first duration of time. One or more operations (e.g., mathematical operations) may be performed using the first content item category factor and/or the initial attribution score to determine the first attribution score. In an example, the first content item category factor may be multiplied by the initial attribution score to determine the first attribution score.

The first content information may comprise one or more products and/or one or more services associated with the first content item. For example, the one or more products and/or the one or more services may be associated with the first entity (e.g., the first entity may offer the one or more products and/or the one or more services for sale). Alternatively and/or additionally, the first content item may be used to advertise and/or promote the one or more products and/or the one or more services.

In some examples, a first entity category (e.g., a product category and/or a service category) associated with the one or more products and/or the one or more services may be determined. For example, the first entity category may correspond to one or more types of products and/or one or more types of services provided by the first entity. In some examples, the first attribution score may be determined based upon the first entity category. The first attribution score may be determined using an entity category data structure. The entity category data structure may comprise a plurality of entity categories and/or a plurality of entity category factors associated with the plurality of entity categories. In some examples, an entity category of the plurality of entity categories may correspond to one or more types of products and/or one or more types of services.

In some examples, an entity category factor of the plurality of entity category factors may be based upon an average duration of time between a content event associated with an entity category of the plurality of entity categories and a conversion event associated with the content event. For each entity category of the plurality of entity categories, an average duration of time, between a content event associated with the entity category and a conversion event associated with the content event, may be determined. For example, activity of client devices may be monitored and/or analyzed to identify a plurality of content events associated with an entity category of the plurality of entity categories. An exemplary content event of the plurality of content events may correspond to a content item associated with an entity (e.g., a content item provided by the content system) being presented, where the content item and/or the entity are associated with one or more types of products and/or one or more types of services associated with the entity category. Alternatively and/or additionally, a plurality of conversion events associated with the plurality of content events may be determined. For example, the plurality of conversion events may comprise an exemplary conversion event associated with the exemplary content event (e.g., the exemplary conversion event may correspond to a purchase of a product and/or a service associated with the entity and/or a different type of conversion event associated with the entity). In some examples, a plurality of durations of time may be determined based upon the plurality of content events and/or the plurality of conversion events. In some examples, an exemplary duration of time of the plurality of durations of time may correspond to a duration of time between the exemplary content event and the exemplary conversion event. An average duration of time associated with the entity category may be determined by performing one or more operations (e.g., mathematical operations) using the plurality of durations of time. For example, the average duration of time may be determined by determining at least one of a mean, a median, a mode, etc. of the plurality of durations of time. In some examples, an entity category factor, of the plurality of entity category factors, associated with the entity category may be determined based upon the average duration of time.

In an example, a first exemplary entity category factor of the plurality of entity category factors may be associated with a first exemplary entity category (e.g., high-end cars) and/or a second exemplary entity category factor of the plurality of entity category factors may be associated with a second exemplary entity category (e.g., e-books). The first exemplary entity category may be associated with a first exemplary average duration of time between a content event associated with the first exemplary entity category and a conversion event associated with the content event. Alternatively and/or additionally, the second exemplary entity category may be associated with a second exemplary average duration of time between a content event associated with the second exemplary entity category and a conversion event associated with the content event. In an example, the first exemplary average duration of time may be different than the second exemplary average duration of time. Accordingly, the first exemplary entity category factor may be different than the second exemplary entity category factor. In an example, the first exemplary average duration of time exceeds the second exemplary average duration of time (e.g., it may take a longer time for an average user to decide to purchase a high-end car after viewing a content item promoting the high-end car than for an average user to decide to purchase an e-book after viewing a content item promoting the e-book). Accordingly, the first exemplary entity category factor may exceed (and/or be less than) the second exemplary entity category factor.

In some examples, the entity category data structure may be analyzed based upon the first entity category to identify a first entity category factor associated with the first entity category. In some examples, one or more operations (e.g., mathematical operations) may be performed using the first entity category factor and/or the first duration of time to determine the first attribution score. Alternatively and/or additionally, one or more operations (e.g., mathematical operations) may be performed using the first entity category factor and/or the initial attribution score (and/or the first content item category factor) to determine the first attribution score. In an example, the first entity category factor (and/or the first content item category factor) may be multiplied by the initial attribution score to determine the first attribution score.

In some examples, the first content information may comprise a first price associated with the one or more products and/or the one or more services associated with the first content item. The first price may correspond to a range of prices associated with purchasing a product of the one or more products and/or a service of the one or more services. In some examples, the first price may be determined by analyzing one or more databases and/or internet resources (e.g., such as one or more databases and/or one or more internet resources associated with the first entity and/or an online shopping platform) to identify one or more prices associated with purchasing the one or more products and/or the one or more services. Alternatively and/or additionally, the first price may be determined based upon the first conversion event. For example, the first price may correspond to an amount paid by the first user to perform the first conversion event (e.g., an amount paid by the first user to purchase a product and/or a service associated with the first entity). In an example, the first price may be determined by analyzing messages (e.g., at least one of instant messages, emails, etc.) associated with the first client device to identify one or more exemplary messages indicative of the amount paid to perform the first conversion event (e.g., a receipt, a proof of purchase, a confirmation email, etc.). In some examples, the amount paid to perform the first conversion event may be included in the first conversion event indication.

In some examples, the first attribution score may be determined based upon the first price. For example, a first price factor may be determined based upon the first price. One or more operations (e.g., mathematical operations) may be performed using the first price to determine the first price factor. Alternatively and/or additionally, the first price factor may be determined using a price data structure. The price data structure may comprise a plurality of price ranges and/or a plurality of price factors associated with the plurality of price ranges.

In some examples, a price factor of the plurality of price factors may be based upon an average duration of time between a content event associated with a price range of the plurality of price ranges and a conversion event associated with the content event. For each price range of the plurality of price ranges, an average duration of time, between a content event associated with the price range and a conversion event associated with the content event, may be determined. For example, activity of client devices may be monitored and/or analyzed to identify a plurality of content events associated with a price range of the plurality of price ranges. An exemplary content event of the plurality of content events may correspond to a content item associated with an entity (e.g., a content item provided by the content system) being presented, where the content item promotes and/or advertises one or more products and/or one or more services that are associated with the price range. Alternatively and/or additionally, a plurality of conversion events associated with the plurality of content events may be determined. For example, the plurality of conversion events may comprise an exemplary conversion event associated with the exemplary content event (e.g., the exemplary conversion event may correspond to a purchase of a product and/or a service associated with the entity and/or a different type of conversion event associated with the entity). In some examples, a plurality of durations of time may be determined based upon the plurality of content events and/or the plurality of conversion events. In some examples, an exemplary duration of time of the plurality of durations of time may correspond to a duration of time between the exemplary content event and the exemplary conversion event. An average duration of time associated with the price range may be determined by performing one or more operations (e.g., mathematical operations) using the plurality of durations of time. For example, the average duration of time may be determined by determining at least one of a mean, a median, a mode, etc. of the plurality of durations of time. In some examples, a price factor, of the plurality of price factors, associated with the price range may be determined based upon the average duration of time.

In an example, a first exemplary price factor of the plurality of price factors may be associated with a first exemplary price range (e.g., $50,000-$100,000) and/or a second exemplary price factor of the plurality of price factors may be associated with a second exemplary price range (e.g., $25-$50). The first exemplary price range may be associated with a first exemplary average duration of time between a content event associated with the first exemplary price range and a conversion event associated with the content event. Alternatively and/or additionally, the second exemplary price range may be associated with a second exemplary average duration of time between a content event associated with the second exemplary price range and a conversion event associated with the content event. In an example, the first exemplary average duration of time may be different than the second exemplary average duration of time. Accordingly, the first exemplary price factor may be different than the second exemplary price factor. In an example, the first exemplary average duration of time exceeds the second exemplary average duration of time (e.g., it may take a longer time for an average user to decide to make a $50,000-$100,000 purchase for a first exemplary product after viewing a content item advertising the first exemplary product than for an average user to decide to make a $25-$50 purchase for a second exemplary product after viewing a content item promoting the second exemplary product). Accordingly, the first exemplary price factor may exceed (and/or be less than) the second exemplary price factor.

In some examples, the price data structure may be analyzed based upon the first price to identify the first price factor associated with the first price. For example, the first price factor may be identified from amongst the plurality of price factors based upon a determination that the first price corresponds to (and/or is included in) a first price range of the plurality of price ranges associated with the first price factor.

In some examples, one or more operations (e.g., mathematical operations) may be performed using the first price factor and/or the first duration of time to determine the first attribution score. Alternatively and/or additionally, one or more operations (e.g., mathematical operations) may be performed using the first price factor and/or the initial attribution score (and/or the first content item category factor and/or the first entity category factor) to determine the first attribution score. In an example, the first price factor (and/or the first content item category factor and/or the first entity category factor) may be multiplied by the initial attribution score to determine the first attribution score.

In some examples, the first attribution score may be determined based upon first device information associated with the first client device. The first device information may comprise at least one of first user information associated with the first client device, first historical activity information, the first type of client device of the first client device and/or the first platform used by the first client device to access and/or present the first content item.

In some examples, the first user information and/or the first historical activity information may be determined based upon the first user profile. The first user information may comprise demographic information associated with the first user, such as a first age (and/or a first age range) of the first user, a first family size associated with the first user, a first gender of the first user, a first occupation of the first user, a first income of the first user, and/or a different demographic parameter associated with the first user.

In some examples, the first attribution score may be determined based upon the first user information. For example, the first attribution score may be determined based upon one or more first demographic parameters of the first user information. The one or more first demographic parameters may correspond to at least one of the first age (and/or the first age range) of the first user, the first family size, the first gender, the first occupation, the first income, a different demographic parameter, etc.

Alternatively and/or additionally, one or more first demographic factors associated with the first user may be determined based upon the one or more first demographic parameters. In an example, a first demographic factor of the one or more first demographic factors may be determined based upon a first demographic parameter of the one or more first demographic parameters. For example, the first demographic parameter may comprise at least one of the first age (and/or the first age range) of the first user, the first family size, the first gender, the first occupation, the first income, a different demographic parameter, etc. In an example where the first demographic parameter is numerical (such as at least one of the first age, the first age range, the first family size, the first income, etc.), one or more operations (e.g., mathematical operations) may be performed using the first demographic parameter to determine the first demographic factor. Alternatively and/or additionally, the first demographic factor may be determined using a demographic data structure associated with a type of demographic parameter of the first demographic parameter. The demographic data structure may comprise a plurality of demographic categories and/or a plurality of demographic factors associated with the plurality of demographic categories. In an example where the first demographic parameter is the first age and/or the first age range, the plurality of demographic categories may correspond to a plurality of age ranges. In an example where the first demographic parameter is the first income, the plurality of demographic categories may correspond to a plurality of income ranges.

In some examples, a demographic factor of the plurality of demographic factors may be based upon an average duration of time between a content event associated with a demographic category of the plurality of demographic categories and a conversion event associated with the content event. For each demographic category of the plurality of demographic categories, an average duration of time, between a content event associated with the demographic category and a conversion event associated with the content event, may be determined. For example, activity of client devices may be monitored and/or analyzed to identify a plurality of content events associated with a demographic category of the plurality of demographic categories. An exemplary content event of the plurality of content events may correspond to a content item associated with an entity (e.g., a content item provided by the content system) being presented via a client device, where the client device is associated with a demographic parameter (such as an age range, an income range, etc.) associated with the demographic category (e.g., a user associated with the client device may be associated with the demographic category). Alternatively and/or additionally, a plurality of conversion events associated with the plurality of content events may be determined. For example, the plurality of conversion events may comprise an exemplary conversion event associated with the exemplary content event (e.g., the exemplary conversion event may correspond to a purchase of a product and/or a service associated with the entity and/or a different type of conversion event associated with the entity). In some examples, a plurality of durations of time may be determined based upon the plurality of content events and/or the plurality of conversion events. In some examples, an exemplary duration of time of the plurality of durations of time may correspond to a duration of time between the exemplary content event and the exemplary conversion event. An average duration of time associated with the demographic category may be determined by performing one or more operations (e.g., mathematical operations) using the plurality of durations of time. For example, the average duration of time may be determined by determining at least one of a mean, a median, a mode, etc. of the plurality of durations of time. In some examples, a demographic factor, of the plurality of demographic factors, associated with the demographic category may be determined based upon the average duration of time.

In an example, a first exemplary demographic factor of the plurality of demographic factors may be associated with a first exemplary demographic category associated with the type of demographic parameter of the first demographic parameter (e.g., an age range, a family size range, an income range, a gender, an occupation, etc.) and/or a second exemplary demographic factor of the plurality of demographic factors may be associated with a second exemplary demographic category associated with the type of demographic parameter of the first demographic parameter. The first exemplary demographic category may be associated with a first exemplary average duration of time between a content event associated with the first exemplary demographic category and a conversion event associated with the content event. Alternatively and/or additionally, the second exemplary demographic category may be associated with a second exemplary average duration of time between a content event associated with the second exemplary demographic category and a conversion event associated with the content event. In an example, the first exemplary average duration of time may be different than the second exemplary average duration of time. Accordingly, the first exemplary demographic factor may be different than the second exemplary demographic factor.

In an example where the type of demographic parameter of the first demographic parameter is age, the first exemplary demographic category may correspond to a first exemplary age range (e.g., 60-70 years old) and/or the second exemplary demographic category may correspond to a second exemplary age range (e.g., 20-30 years old). The first exemplary average duration of time may exceed the second exemplary average duration of time (e.g., it may take a longer time for an average 60 to 70-year old user to perform a conversion event after viewing a content item than for an average 20 to 30-year old user to perform a conversion event after viewing a content item). Accordingly, the first exemplary demographic factor may exceed (and/or be less than) the second exemplary demographic factor.

In an example where the type of demographic parameter of the first demographic parameter is income, the first exemplary demographic category may correspond to a first exemplary income range (e.g., $40,000-$60,000 annual income) and/or the second exemplary demographic category may correspond to a second exemplary income range (e.g., $400,000-$600,000 annual income). The first exemplary average duration of time may exceed the second exemplary average duration of time (e.g., it may take a longer time for an average user with $40,000-$60,000 annual income to perform a conversion event after viewing a content item than for an average user with $400,000-$600,000 annual income to perform a conversion event after viewing a content item). Accordingly, the first exemplary demographic factor may exceed (and/or be less than) the second exemplary demographic factor.

In some examples, the demographic data structure may be analyzed based upon the first demographic parameter to identify the first demographic factor associated with the first demographic parameter. For example, the first demographic factor may be identified from amongst the plurality of demographic factors based upon a determination that the first demographic parameter corresponds to (and/or is included in) a first demographic category of the plurality of demographic categories associated with the first demographic factor.

In some examples, one or more operations (e.g., mathematical operations) may be performed using the one or more first demographic factors and/or the first duration of time to determine the first attribution score. Alternatively and/or additionally, one or more operations (e.g., mathematical operations) may be performed using the one or more first demographic factors and/or the initial attribution score (and/or the first content item category factor, the first entity category factor and/or the first price factor) to determine the first attribution score. In an example, the one or more first demographic factors (and/or the first content item category factor, the first entity category factor and/or the first price factor) may be multiplied by the initial attribution score to determine the first attribution score.

In some examples, the first historical activity information may comprise first conversion behavior information associated with the first user. For example, the first conversion behavior information may be indicative of a first conversion duration of time between a content event and a conversion event associated with the first user. In some examples, the first conversion duration of time may be determined based upon a plurality of content events associated with the first client device (and/or a different client device associated with the first user) and/or a plurality of conversion events performed by the first client device (and/or a different client device associated with the first user). In some examples, the plurality of content events and/or the plurality of conversion events may be determined and/or detected using one or more of the techniques presented herein (e.g., by analyzing and/or monitoring activity associated with the first client device and/or a different client device associated with the first user).

In some examples, the first conversion duration of time may be determined based upon a plurality of durations of time associated with the plurality of content events and/or the plurality of conversion events. A duration of time of the plurality of durations of time may correspond to a duration of time between a content event of the plurality of content events and a conversion event, associated with the content event, of the plurality of conversion events. In an example, a first exemplary conversion event of the plurality of conversion events may be associated with a first exemplary content event of the plurality of content events. The first exemplary content event may correspond to presentation (and/or selection) of an exemplary content item associated with an exemplary entity. The first exemplary conversion event may be associated with the exemplary entity (e.g., the first exemplary conversion event may correspond to purchasing one or more products and/or one or more services associated with the exemplary entity and/or the first exemplary conversion event may correspond to a different type of conversion event associated with the exemplary entity). A first exemplary duration of time of the plurality of durations of time may correspond to a duration of time between the first exemplary content event and the first exemplary conversion event.

In some examples, the first conversion duration of time may be determined by performing one or more operations (e.g., mathematical operations) using the plurality of durations of time. For example, the first conversion duration of time may be determined by determining at least one of a mean, a median, a mode, etc. of the plurality of durations of time.

In some examples, the first attribution score may be determined based upon the first conversion duration of time. For example, one or more operations (e.g., mathematical operations) may be performed using the duration of time and/or the first conversion duration of time to determine the first attribution score. Alternatively and/or additionally, one or more operations (e.g., mathematical operations) may be performed using the first conversion duration of time and/or the initial attribution score (and/or the first content item category factor, the first entity category factor, the first price factor and/or the one or more first demographic factors) to determine the first attribution score.

Alternatively and/or additionally, the first attribution score may be determined based upon a comparison of the first conversion duration of time with the first duration of time between the first content event and the first conversion event. For example, the first attribution score may be determined based upon a difference between the first conversion duration of time and/or the first duration of time and/or based upon a determination of whether the first conversion duration of time is greater than or less than the first duration of time. In a first example, the first duration of time may exceed the first conversion duration of time. In a second example, the first duration of time may be less than the first conversion duration of time. The first attribution score with respect to the first example may be less than the first attribution score with respect to the second example.

In some examples, a first conversion duration factor may be determined based upon the first conversion duration of time. Alternatively and/or additionally, the first conversion duration factor may be determined based upon the comparison of the first conversion duration of time with the first duration of time between the first content event and the first conversion event. For example, the first conversion duration factor may be determined based upon the difference between the first conversion duration of time and the first duration of time and/or based upon a determination of whether the first conversion duration of time is greater than or less than the first duration of time.

In some examples, one or more operations (e.g., mathematical operations) may be performed using the first conversion duration factor and/or the first duration of time to determine the first attribution score. Alternatively and/or additionally, one or more operations (e.g., mathematical operations) may be performed using the first conversion duration factor and/or the initial attribution score (and/or the first content item category factor, the first entity category factor, the first price factor and/or the one or more first demographic factors) to determine the first attribution score. In an example, the first conversion duration factor (and/or the first content item category factor, the first entity category factor, the first price factor and/or the one or more first demographic factors) may be multiplied by the initial attribution score to determine the first attribution score.

In some examples, the first attribution score may be determined based upon the first type of client device of the first client device used to perform the first content event. For example, the first attribution score may be determined using a client device type data structure. The client device type data structure may comprise a plurality of client device types and/or a plurality of client device type factors associated with the plurality of client device types. In some examples, a client device type of the plurality of client device types may correspond to a type of client device, such as at least one of a computer, a phone, a smartphone, a laptop, a tablet, a wearable device, a different type of client device, etc.

In some examples, a client device type factor of the plurality of client device type factors may be based upon an average duration of time between a content event associated with a client device type of the plurality of client device types and a conversion event associated with the content event. For each client device type of the plurality of client device types, an average duration of time, between a content event associated with the client device type and a conversion event associated with the content event, may be determined. For example, activity of client devices may be monitored and/or analyzed to identify a plurality of content events associated with a client device type of the plurality of client device types. An exemplary content event of the plurality of content events may correspond to a content item associated with an entity (e.g., a content item provided by the content system) being presented via a client device corresponding to the client device type. Alternatively and/or additionally, a plurality of conversion events associated with the plurality of content events may be determined. For example, the plurality of conversion events may comprise an exemplary conversion event associated with the exemplary content event (e.g., the exemplary conversion event may correspond to a purchase of a product and/or a service associated with the entity and/or a different type of conversion event associated with the entity). In some examples, a plurality of durations of time may be determined based upon the plurality of content events and/or the plurality of conversion events. In some examples, an exemplary duration of time of the plurality of durations of time may correspond to a duration of time between the exemplary content event and the exemplary conversion event. An average duration of time associated with the client device type may be determined by performing one or more operations (e.g., mathematical operations) using the plurality of durations of time. For example, the average duration of time may be determined by determining at least one of a mean, a median, a mode, etc. of the plurality of durations of time. In some examples, a client device type factor, of the plurality of client device type factors, associated with the client device type may be determined based upon the average duration of time.

In an example, a first exemplary client device type factor of the plurality of client device type factors may be associated with a first exemplary client device type (e.g., a smartphone) and/or a second exemplary client device type factor of the plurality of client device type factors may be associated with a second exemplary client device type (e.g., a laptop). The first exemplary client device type may be associated with a first exemplary average duration of time between a content event associated with the first exemplary client device type and a conversion event associated with the content event. Alternatively and/or additionally, the second exemplary client device type may be associated with a second exemplary average duration of time between a content event associated with the second exemplary client device type and a conversion event associated with the content event. In an example, the first exemplary average duration of time may be different than the second exemplary average duration of time. Accordingly, the first exemplary client device type factor may be different than the second exemplary client device type factor. In an example, the first exemplary average duration of time exceeds the second exemplary average duration of time (e.g., it may take a longer time for an average user to perform a conversion event after viewing a content item using a smartphone than for an average user to perform a conversion event after viewing a content item using a laptop, such as due to less difficulty performing a conversion event using a laptop in comparison with performing a conversion event using a smartphone). Accordingly, the first exemplary client device type factor may exceed (and/or be less than) the second exemplary client device type factor.

In some examples, the client device type data structure may be analyzed based upon the first type of client device of the first client device to identify a first client device type factor associated with the first type of client device. In some examples, one or more operations (e.g., mathematical operations) may be performed using the first client device type factor and/or the first duration of time to determine the first attribution score. Alternatively and/or additionally, one or more operations (e.g., mathematical operations) may be performed using the first client device type factor and/or the initial attribution score (and/or the first content item category factor, the first entity category factor, the first price factor, the one or more first demographic factors and/or the first conversion duration factor) to determine the first attribution score. In an example, the first client device type factor (and/or the first content item category factor, the first entity category factor, the first price factor, the one or more first demographic factors and/or the first conversion duration factor) may be multiplied by the initial attribution score to determine the first attribution score.

In some examples, the first attribution score may be determined based upon the first platform used to perform the first content event. For example, the first attribution score may be determined using a platform category data structure. The platform category data structure may comprise a plurality of platform categories and/or a plurality of platform category factors associated with the plurality of platform categories. In some examples, a platform category of the plurality of platform categories may correspond to a type of platform, such as at least one of a browser, an email application, a news application, a multimedia application, a different type of platform, etc.

In some examples, a platform category factor of the plurality of platform category factors may be based upon an average duration of time between a content event associated with a platform category of the plurality of platform categories and a conversion event associated with the content event. For each platform category of the plurality of platform categories, an average duration of time, between a content event associated with the platform category and a conversion event associated with the content event, may be determined. For example, activity of client devices may be monitored and/or analyzed to identify a plurality of content events associated with a platform category of the plurality of platform categories. An exemplary content event of the plurality of content events may correspond to a content item associated with an entity (e.g., a content item provided by the content system) being presented using a platform corresponding to the platform category. Alternatively and/or additionally, a plurality of conversion events associated with the plurality of content events may be determined. For example, the plurality of conversion events may comprise an exemplary conversion event associated with the exemplary content event (e.g., the exemplary conversion event may correspond to a purchase of a product and/or a service associated with the entity and/or a different type of conversion event associated with the entity). In some examples, a plurality of durations of time may be determined based upon the plurality of content events and/or the plurality of conversion events. In some examples, an exemplary duration of time of the plurality of durations of time may correspond to a duration of time between the exemplary content event and the exemplary conversion event. An average duration of time associated with the platform category may be determined by performing one or more operations (e.g., mathematical operations) using the plurality of durations of time. For example, the average duration of time may be determined by determining at least one of a mean, a median, a mode, etc. of the plurality of durations of time. In some examples, a platform category factor, of the plurality of platform category factors, associated with the platform category may be determined based upon the average duration of time.

In an example, a first exemplary platform category factor of the plurality of platform category factors may be associated with a first exemplary platform category (e.g., an email application) and/or a second exemplary platform category factor of the plurality of platform category factors may be associated with a second exemplary platform category (e.g., a browser). The first exemplary platform category may be associated with a first exemplary average duration of time between a content event associated with the first exemplary platform category and a conversion event associated with the content event. Alternatively and/or additionally, the second exemplary platform category may be associated with a second exemplary average duration of time between a content event associated with the second exemplary platform category and a conversion event associated with the content event. In an example, the first exemplary average duration of time may be different than the second exemplary average duration of time. Accordingly, the first exemplary platform category factor may be different than the second exemplary platform category factor. In an example, the first exemplary average duration of time exceeds the second exemplary average duration of time (e.g., it may take a longer time for an average user to perform a conversion event after viewing a content item using an email application than for an average user to perform a conversion event after viewing a content item using a browser). Accordingly, the first exemplary platform category factor may exceed (and/or be less than) the second exemplary platform category factor.

In some examples, the platform category data structure may be analyzed based upon the first platform (used to access and/or present the first content item) to identify a first platform category factor associated with the first platform. In some examples, one or more operations (e.g., mathematical operations) may be performed using the first platform category factor and/or the first duration of time to determine the first attribution score. Alternatively and/or additionally, one or more operations (e.g., mathematical operations) may be performed using the first platform category factor and/or the initial attribution score (and/or the first content item category factor, the first entity category factor, the first price factor, the one or more first demographic factors, the first conversion duration factor and/or the first client device type factor) to determine the first attribution score. In an example, the first platform category factor (and/or the first content item category factor, the first entity category factor, the first price factor, the one or more first demographic factors, the first conversion duration factor and/or the first client device type factor) may be multiplied by the initial attribution score to determine the first attribution score.

In some examples, the first attribution score may be determined based upon the first internet resource within which the first content item is accessed and/or presented. For example, the first attribution score may be determined using a resource category data structure. The resource category data structure may comprise a plurality of resource categories and/or a plurality of resource category factors associated with the plurality of resource categories. In some examples, a resource category of the plurality of resource categories may correspond to a category of internet resources, such as internet resources associated with a topic (e.g., internet resources associated with at least one of politics, product reviews, technical specifications, cuisine, news, geography, etc.), internet resources associated with a use (e.g., email, messaging and/or communication internet resources used for communicating, shopping internet resources used for shopping, research internet resources used for doing research, news internet resources, entertainment internet resources, internet resources for playing games, etc.), internet resources associated with a type of content (e.g., audio content, blog articles, news content, videos, entertainment, games, etc.), etc.

In some examples, a resource category factor of the plurality of resource category factors may be based upon an average duration of time between a content event associated with a resource category of the plurality of resource categories and a conversion event associated with the content event. For each resource category of the plurality of resource categories, an average duration of time, between a content event associated with the resource category and a conversion event associated with the content event, may be determined. For example, activity of client devices may be monitored and/or analyzed to identify a plurality of content events associated with a resource category of the plurality of resource categories. An exemplary content event of the plurality of content events may correspond to a content item associated with an entity (e.g., a content item provided by the content system) being presented via an internet resource corresponding to the resource category. Alternatively and/or additionally, a plurality of conversion events associated with the plurality of content events may be determined. For example, the plurality of conversion events may comprise an exemplary conversion event associated with the exemplary content event (e.g., the exemplary conversion event may correspond to a purchase of a product and/or a service associated with the entity and/or a different type of conversion event associated with the entity). In some examples, a plurality of durations of time may be determined based upon the plurality of content events and/or the plurality of conversion events. In some examples, an exemplary duration of time of the plurality of durations of time may correspond to a duration of time between the exemplary content event and the exemplary conversion event. An average duration of time associated with the resource category may be determined by performing one or more operations (e.g., mathematical operations) using the plurality of durations of time. For example, the average duration of time may be determined by determining at least one of a mean, a median, a mode, etc. of the plurality of durations of time. In some examples, a resource category factor, of the plurality of resource category factors, associated with the resource category may be determined based upon the average duration of time.

In an example, a first exemplary resource category factor of the plurality of resource category factors may be associated with a first exemplary resource category (e.g., news websites) and/or a second exemplary resource category factor of the plurality of resource category factors may be associated with a second exemplary resource category (e.g., shopping websites). The first exemplary resource category may be associated with a first exemplary average duration of time between a content event associated with the first exemplary resource category and a conversion event associated with the content event. Alternatively and/or additionally, the second exemplary resource category may be associated with a second exemplary average duration of time between a content event associated with the second exemplary resource category and a conversion event associated with the content event. In an example, the first exemplary average duration of time may be different than the second exemplary average duration of time. Accordingly, the first exemplary resource category factor may be different than the second exemplary resource category factor. In an example, the first exemplary average duration of time exceeds the second exemplary average duration of time (e.g., it may take a longer time for an average user to perform a conversion event after viewing a content item in a news website than for an average user to perform a conversion event after viewing a content item in a shopping website). Accordingly, the first exemplary resource category factor may exceed (and/or be less than) the second exemplary resource category factor.

In some examples, the resource category data structure may be analyzed based upon the first internet resource to identify a first resource category factor associated with the first internet resource. In some examples, one or more operations (e.g., mathematical operations) may be performed using the first resource category factor and the first duration of time to determine the first attribution score. Alternatively and/or additionally, one or more operations (e.g., mathematical operations) may be performed using the first resource category factor and/or the initial attribution score (and/or the first content item category factor, the first entity category factor, the first price factor, the one or more first demographic factors, the first conversion duration factor, the first client device type factor and/or the first platform category factor) to determine the first attribution score. In an example, the first resource category factor (and/or the first content item category factor, the first entity category factor, the first price factor, the one or more first demographic factors, the first conversion duration factor, the first client device type factor and/or the first platform category factor) may be multiplied by the initial attribution score to determine the first attribution score.

At 410, a first plurality of attribution scores comprising the first attribution score may be stored in a first attribution data structure associated with the first content item. The first plurality of attribution scores may be associated with the first content item. For example, an attribution score of the first plurality of attribution scores may be associated with a content event associated with the first content item and/or a conversion event associated with the first entity. In some examples, the first plurality of attribution scores may be determined using one or more of the techniques presented herein with respect to detecting the first content event, detecting the first conversion event and/or determining the first attribution score. In some examples, the first attribution data structure may comprise indications of a first plurality of client devices and/or a first plurality of user profiles associated with the first plurality of attribution scores. For example, an indication of the first client device and/or an indication of the first user profile may be included in the first attribution data structure based upon a determination that the first content event and/or the first conversion event are performed using the first client device associated with the first user profile.

At 412, a second request for content associated with a second client device may be received. The second request for content may be received responsive to the second client device accessing a second internet resource associated with the content system (e.g., one or more of a web page of a website associated with the content system, an application associated with the content system, an internet game associated with the content system, etc.). For example, the second client device may transmit a request to access the second internet resource to a third server associated with the second internet resource. Responsive to receiving the request to access the second internet resource, the third server associated with the second internet resource may transmit the second request for content to the content system (and/or to the second server associated with the content system). Alternatively and/or additionally, the second request for content may be received from the second client device. In some examples, the second request for content may correspond to a request to be provided with a content item (e.g., an advertisement, an image, a link, a video, etc.) for presentation via the second internet resource.

At 414, responsive to receiving the second request for content, the first content item may be selected from a second plurality of content items, based upon the first attribution data structure, for presentation via the second client device.

For example, responsive to receiving the second request for content, a bidding process may be performed to select a content item from the second plurality of content items participating in an auction (e.g., an auction for selection of a content item to present via the second client device). In some examples, the second plurality of content items (participating in the auction) comprise the first content item.

In some examples, a second plurality of bid values associated with the second plurality of content items may be determined. In some examples, the second plurality of bid values may be determined based upon budgets (e.g., daily budgets) and/or target spend patterns associated with the second plurality of content items. For example, the second plurality of bid values and/or the budgets may be received from devices associated with entities (e.g., advertisers, companies, brands, organizations, etc.) associated with the second plurality of content items. In some examples, the second plurality of bid values may comprise a second bid value associated with the first content item.

In some examples, a first plurality of conversion scores associated with the second plurality of content items may be determined. In some examples, a conversion score of the first plurality of conversion scores may be indicative of a probability of the second client device performing a conversion event associated with an entity after a content item, of the second plurality of content items, associated with the entity, is presented via the second client device. Alternatively and/or additionally, a conversion score of the first plurality of conversion scores may be indicative of a probability that presentation of a content item of the second plurality of content items via the second client device will influence a second user associated with the second client device to perform a conversion event associated with an entity associated with the content item.

In some examples, the first plurality of conversion scores may be determined based upon a plurality of attribution data structures associated with the second plurality of content items. Alternatively and/or additionally, the first plurality of conversion scores may be determined based upon a second user profile associated with the second client device.

The first plurality of conversion scores may comprise a first conversion score associated with the first content item. The first conversion score may be indicative of a probability of the second client device performing a conversion event associated with the first entity after the first content item is presented via the second client device (in the event that the first content item is selected for presentation via the second client device in the auction). Alternatively and/or additionally, the first conversion score may be indicative of a probability that presentation of the first content item via the second client device will influence the second user associated with the second client device to perform a conversion event associated with the first entity.

In some examples, the first conversion score may be determined based upon the first attribution data structure associated with the first content item. Alternatively and/or additionally, the first conversion score may be determined based upon the first plurality of attribution scores, the first plurality of user profiles associated with the first plurality of attribution scores and/or the second user profile associated with the second client device.

In some examples, the second user profile may comprise second device information associated with the second client device. For example, the second device information may comprise second user information associated with the second user, such as one or more of age (and/or age range), family size, gender, occupation, income, and/or other demographic information. Alternatively and/or additionally, the second device information may comprise second activity information associated with the second client device, such as at least one of one or more consumed content items (e.g., a consumed content item may correspond to at least one of an article, a video, an audio file, an image, a web page, an advertisement, an email, a message, etc. consumed using the second client device), one or more accessed content items, one or more selected content items, one or more content item interactions (e.g., an advertisement impression, an advertisement click, etc.), etc.

The first plurality of user profiles may comprise a first plurality of sets of device information associated with the first plurality of client devices (associated with the first plurality of attribution scores). For example, a user profile of the first plurality of user profiles may comprise a set of device information associated with a client device of the first plurality of client devices (e.g., the set of device information may comprise user information associated with a user of the client device, activity information associated with the client device, etc.).

In some examples, the second device information associated with the second client device may be compared with the first plurality of sets of device information associated with the first plurality of client devices to identify related sets of device information of the first plurality of sets of device information that are related to the second device information. For example, a set of device information of the first plurality of sets of device information may be selected for inclusion in the related sets of device information based upon a determination that the set of device information has one or more first features matching one or more second features of the second device information.

For example, the one or more first features and/or the one or more second features may comprise one or more demographic parameters (e.g., at least one of an age indicated by the second device information may match an age indicated by the set of device information, an income indicated by the second device information may match an income indicated by the set of device information, a family size indicated by the second device information may match a family size indicated by the set of device information, an occupation indicated by the second device information may match an occupation indicated by the set of device information, etc.).

Alternatively and/or additionally, the one or more first features and/or the one or more second features may comprise one or more actions associated with device activity (e.g., at least one of the second device information and the set of device information may both be indicative of accessing one or more same internet resources, the second device information and the set of device information may both be indicative of consuming and/or displaying one or more same content items, the second device information and the set of device information may both be indicative of selecting one or more same content items, etc.).

In some examples, the first conversion score may be determined based upon related attribution scores, of the first plurality of attribution scores, associated with the related sets of device information. A related attribution score of the related attribution scores may be identified based upon a determination that the related attribution score is associated with a client device, of the first plurality of client devices, associated with a related set of device information determined to be related to the second device information associated with the second client device. For example, one or more operations (e.g., mathematical operations) may be performed using the related attribution scores to determine the first conversion score.

In some examples, the first conversion score may be determined based upon the related attribution scores and/or the related sets of device information associated with the related attribution scores. In determining the first conversion score, sets of device information (and/or content events and/or conversion events) associated with higher attribution scores of the related attribution scores may be emphasized more than sets of device information (and/or content events and/or conversion events) associated with lower attribution scores. In an example, the first conversion score may be determined based upon comparisons of the related sets of device information with the second device information associated with the second client device. For example, the second device information may be compared with a set of device information of the related sets of device information to determine comparison information. The comparison information may comprise one or more differences and/or one or more similarities between the second device information and the set of device information. The first conversion score may be determined based upon the comparison information. An emphasis and/or a weight with which the comparison information is used for determining the first conversion score may be based upon an attribution score, of the related attribution scores, associated with the set of device information. In a first example, the attribution score may be a first value. In a second example, the attribution score may be a second value, less than the first value. The emphasis and/or the weight with which the comparison information is used for determining the first conversion score may be greater in the first example than in the second example. For example, in the first example, the comparison information may have more influence on determination of the first conversion score than in the second example.

It may be appreciated that determining the first conversion score based upon the related attribution scores, such as by emphasizing sets of device information (and/or content events and/or conversion events) based upon the related attribution scores, may result in more accurately determining the first conversion score. Alternatively and/or additionally, determining the first conversion score based upon the related attribution scores may result in more accurately determining and/or predicting a probability of the second client device performing a conversion event associated with the first entity after the first content item is presented via the second client device.

Alternatively and/or additionally, the first conversion score may be determined based upon the related attribution scores and/or other information. In an example, the other information may comprise the second activity information. For example, the second activity information may be analyzed to determine a set of activity performed by the second client device that indicates that the second user may have an interest in subject matter of the first content item. The set of activity may be associated with a topic and/or subject matter related to subject matter of the first content item. In an example, the first conversion score may be determined based upon the related attribution scores and/or the set of activity.

In some examples, the first conversion score may be determined using one or more machine learning techniques. For example, the first conversion score may be determined using a machine learning model based upon data input to the machine learning model. In some examples, the first attribution data structure, the first plurality of sets of device information associated with the first attribution data structure and/or the second device information associated with the second client device may be input to the machine learning model. The machine learning model may determine and/or output the first conversion score based upon the first attribution data structure, the first plurality of sets of device information, the second device information and/or other information input to the machine learning model.

In some examples, the first content item may be selected from the second plurality of content items based upon the first plurality of conversion scores associated with the second plurality of content items. For example, the first content item may be selected from the second plurality of content items based upon a determination that the first conversion score associated with the first content item exceeds a threshold conversion score. Alternatively and/or additionally, the first content item may be selected from the second plurality of content items based upon a determination that the first conversion score is greater than one or more other conversion scores of the first plurality of conversion scores. Alternatively and/or additionally, the first content item may be selected from the second plurality of content items based upon a determination that the first conversion score is a highest conversion score of the first plurality of conversion scores.

Alternatively and/or additionally, a second plurality of content item scores associated with the second plurality of content items may be determined. For example, the second plurality of content items scores may be determined based upon the second plurality of bid values, the second plurality of conversion scores and/or a second plurality of click probabilities associated with the second plurality of content items. The second plurality of click probabilities may be determined based upon content information associated with the second plurality of content items and/or the second user profile associated with the second client device. In some examples, a click probability of the second plurality of click probabilities may correspond to a probability of receiving a selection of a content item responsive to presenting the content item via the second client device. Alternatively and/or additionally, a click probability of the second plurality of click probabilities may correspond to a probability of receiving a positive signal responsive to presenting a content item via the second client device.

In some examples, the second plurality of content item scores may comprise a second content item score associated with the first content item. The second content item score may be determined by performing one or more operations (e.g., mathematical operations) using the second bid value associated with the first content item, the first conversion score associated with the first content item and/or a click probability associated with the first content item. In some examples, the first content item may be selected from the second plurality of content items for presentation via the second client device based upon the second plurality of content item scores. The first content item may be selected from the second plurality of content items based upon a determination that the second content item score associated with the first content item exceeds a threshold content item score. Alternatively and/or additionally, the first content item may be selected from the second plurality of content items based upon a determination that the second content item score is greater than one or more other content item scores of the second plurality of content item scores. Alternatively and/or additionally, the first content item may be selected from the second plurality of content items based upon a determination that the second content item score is a highest content item score of the second plurality of content item scores.

At 416, the first content item may be transmitted to the second client device. For example, the first content item may be transmitted to the second client device responsive to selecting the first content item for presentation via the second client device. The first content item may be presented via the second client device. For example, the first content item may be presented via the second internet resource on the second client device, such as while the second internet resource is accessed and/or displayed.

It may be appreciated that controlling transmission of the first content item based upon the first attribution data structure may create a closed-loop process allowing content events and/or conversion events associated with the first content item as feedback to tailor parameters of the content system (such as by determining attribution scores based upon content events and/or conversion events associated with the first content item, storing the attribution scores in the first attribution data structure and/or selecting the first content item for presentation via client devices based upon information comprising the first attribution data structure). Closed-loop control may reduce errors and produce more efficient operation of a computer system which implements the content system. The reduction of errors and/or the efficient operation of the computer system may improve operational stability and/or predictability of operation. Accordingly, using processing circuitry to implement closed loop control described herein may improve operation of underlying hardware of the computer system.

A controller device may be configured to perform one or more of the techniques presented herein. For example, the controller device may be configured to detect content events and/or conversion events associated with content items. The controller device may be configured to determine and/or store attribution scores based upon the content events and/or conversion events. Determining and/or storing the attribution scores causes an improvement to the controller device, enabling the controller device to more accurately select and/or transmit content items for presentation via client devices, with fewer errors. For example, prior to storing the attribution scores, a content item may be selected for presentation via a client device and/or placed in a queue of content items associated with the client device. Responsive to storing the attribution scores, the queue of content items may be updated based upon the attribution scores to remove the content item and/or place a different content item in place of the content item for presentation via the client device. The different content item may be a more accurate selection for presentation via the client device, relative to the content item. For example, responsive to receiving a request for content associated with the client device, the different content item may be presented via the client device instead of the content item.

FIGS. 5A-5K illustrate examples of a system 501 for selecting content items for presentation via devices. A first user, such as user Jennifer, and/or a first client device 500 associated with the first user, may access and/or interact with a service, such as a browser, software, a website, an application, an operating system, an email interface, a messaging interface, a music-streaming application, a video application, etc. that provides a platform for viewing and/or downloading content from a server associated with a content system. In some examples, the content system may use device information associated with the first client device 500, such as at least one of activity information associated with the first client device 500, demographic information associated with the first user, location information associated with the first client device 500, etc. to select content for presentation to the first user.

Figure 5A:
FIG. 5A is a component block diagram illustrating an example system for selecting content items for presentation via devices, where a first client device presents and/or accesses a first web page using a browser of the first client device.

FIG. 5A illustrates the first client device 500 presenting and/or accessing a first web page 508 using a browser of the first client device 500. The browser may comprise an address bar 502 comprising a web address (e.g., a uniform resource locator (URL)) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

Figure 5B:
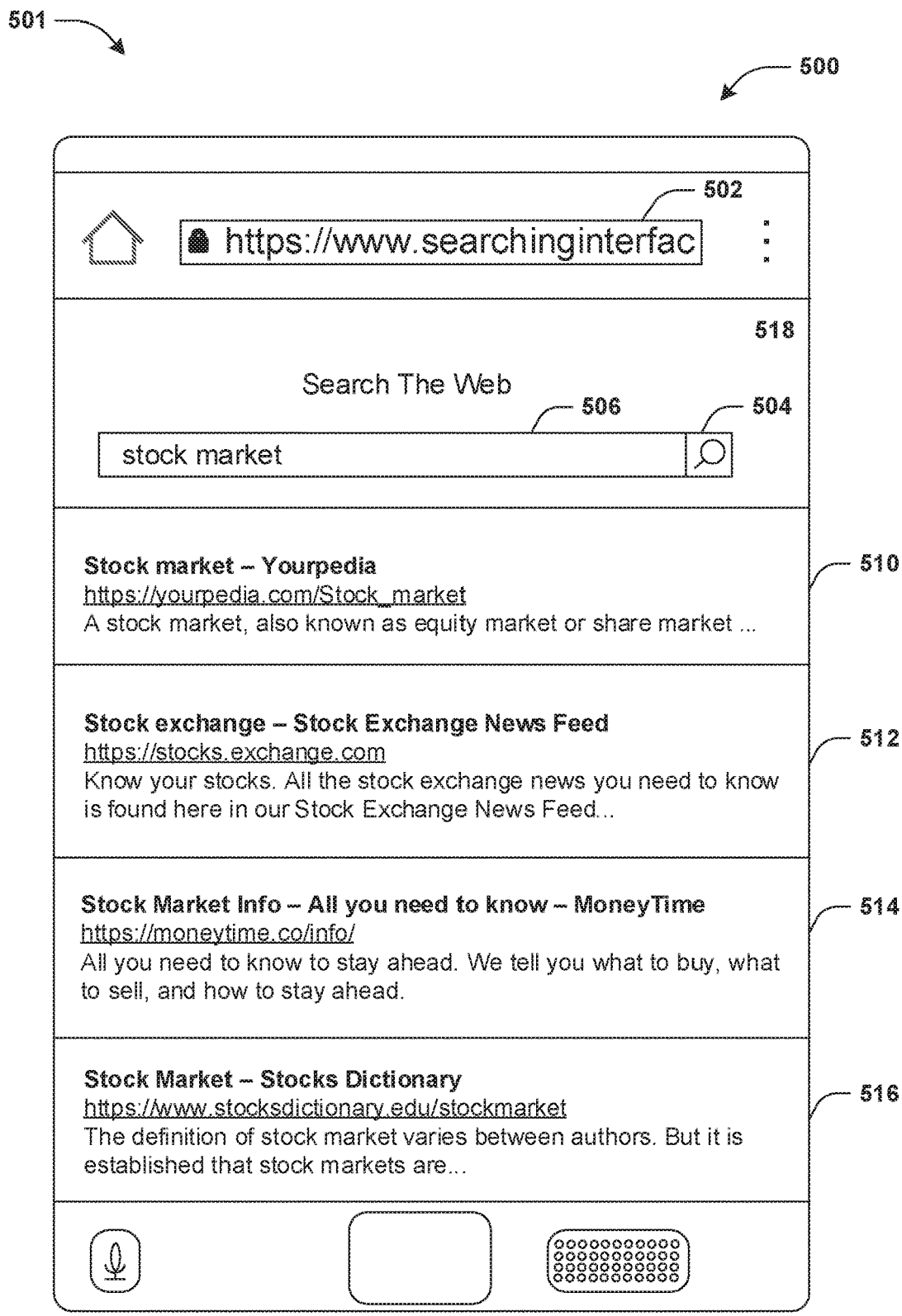
FIG. 5B is a component block diagram illustrating an example system for selecting content items for presentation via devices, where a first client device presents a plurality of search results associated with a query using a browser.

FIG. 5B illustrates the first client device 500 presenting a plurality of search results associated with the query using the browser of the first client device 500. For example, the plurality of search results may be presented within a second web page 518. For example, the plurality of search results may comprise a first search result 510 corresponding to a third web page, a second search result 512 corresponding to a fourth web page 544 (illustrated in FIG. 5E), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 544 may be selected (e.g., the second search result 512 may be selected via a second selectable input corresponding to the second search result 512).

Figure 5C:
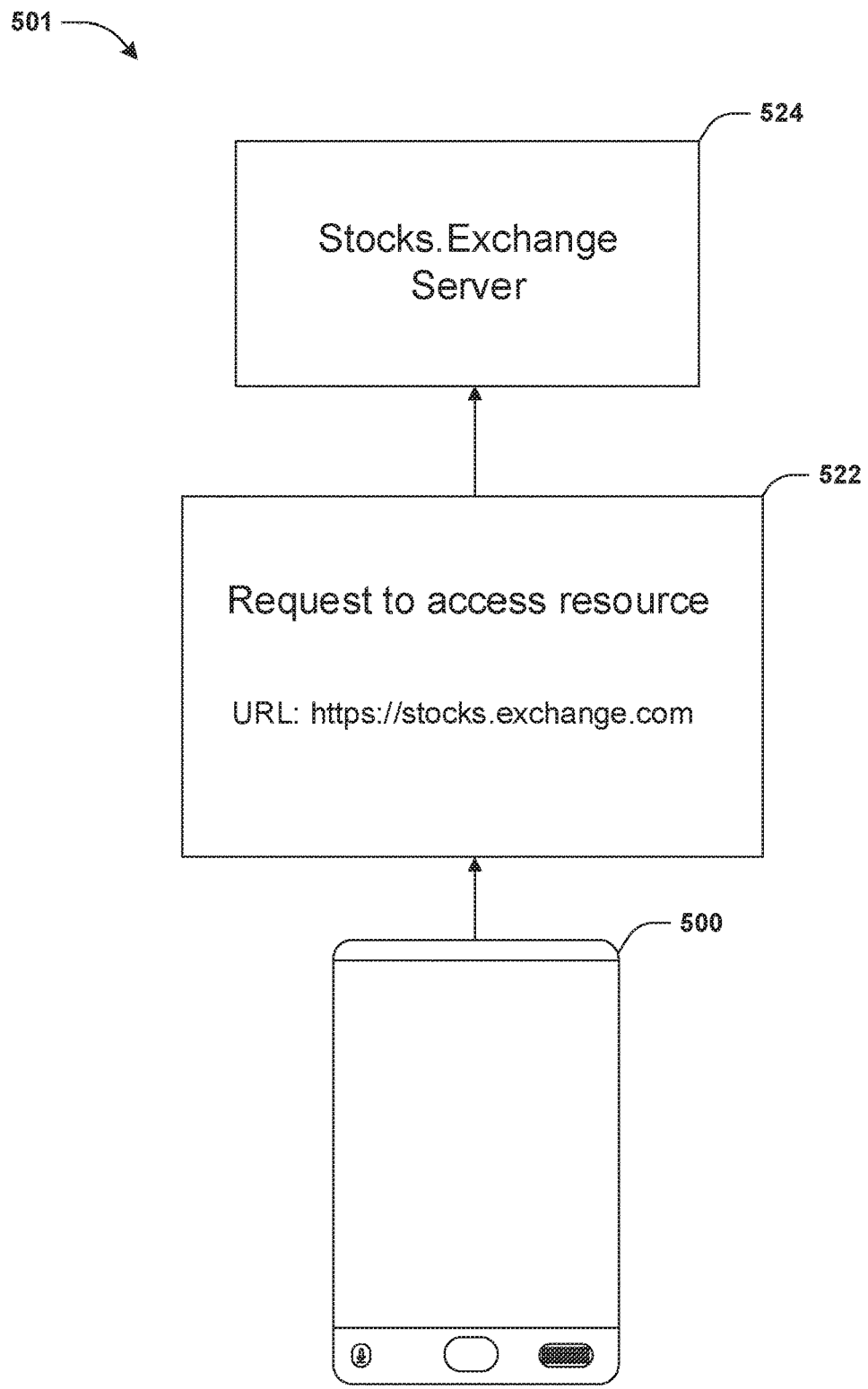
FIG. 5C is a component block diagram illustrating an example system for selecting content items for presentation via devices, where a first client device transmits a request to access a resource to a first server.

FIG. 5C illustrates the first client device 500 transmitting a request 522 to access a resource to a first server 524. In some examples, the request 522 to access the resource may be transmitted responsive to the second search result 512 being selected. For example, the resource may correspond to the fourth web page 544. For example, the request 522 to access the resource may comprise an indication of the fourth web page 544 (e.g., a web address "https://stocks.exchange.com"). Alternatively and/or additionally, the first server 524 may be associated with the fourth web page 544.

Figure 5D:
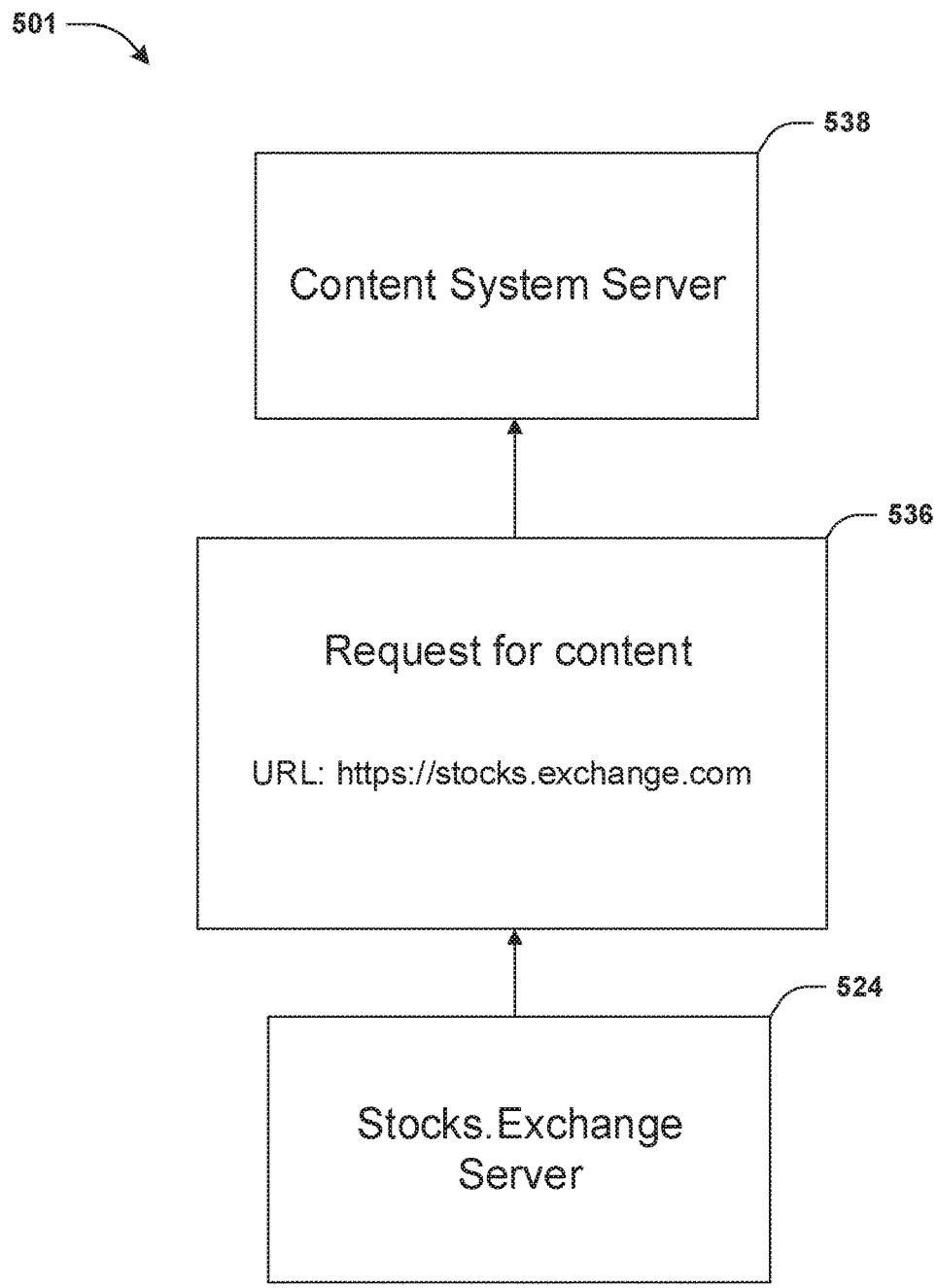
FIG. 5D is a component block diagram illustrating an example system for selecting content items for presentation via devices, where a first server transmits a first request for content to a second server associated with a content system.

FIG. 5D illustrates the first server 524 transmitting a first request for content 536 to a second server 538 associated with the content system. In some examples, the first request for content 536 may be transmitted (by the first server 524) responsive to receiving the request 522 to access the resource. Alternatively and/or additionally, the first request for content 536 may be transmitted (to the second server 538) by the first client device 500. In some examples, the first request for content 536 may be a request to be provided with a content item (e.g., an advertisement, an image, a link, a video, etc.) for presentation via the fourth web page 544.

In some examples, responsive to receiving the first request for content 536, a bidding process may be performed to select a content item from a first plurality of content items participating in an auction (e.g., an auction for selection of a content item to present via the first client device 500). In some examples, the first plurality of content items (participating in the auction) may comprise a first content item 546 (illustrated in FIG. 5E).

In some examples, a first plurality of bid values associated with the first plurality of content items may be determined. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items. In some examples, the first plurality of bid values may comprise a first bid value associated with the first content item 546.

In some examples, the first content item 546 may be selected from the first plurality of content items for presentation via the first client device 500 based upon the first plurality of bid values. For example, the first content item 546 may be selected from the first plurality of content items based upon a determination that the first bid value associated with the first content item 546 exceeds a threshold bid value. Alternatively and/or additionally, the first content item 546 may be selected from the first plurality of content items based upon a determination that the first bid value is greater than one or more other bid values of the first plurality of bid values. Alternatively and/or additionally, the first content item 546 may be selected from the first plurality of content items based upon a determination that the first bid value is a highest bid value of the first plurality of bid values.

Alternatively and/or additionally, a first plurality of content item scores associated with the first plurality of content items may be determined. For example, the first plurality of content items scores may be determined based upon the first plurality of bid values and/or a first plurality of click probabilities associated with the first plurality of content items. In some examples, the first content item 546 may be selected from the first plurality of content items for presentation via the first client device 500 based upon the first plurality of content item scores. For example, the first content item 546 may be selected from the first plurality of content items based upon a determination that a first content item score associated with the first content item 546 exceeds a threshold content item score. Alternatively and/or additionally, the first content item 546 may be selected from the first plurality of content items based upon a determination that the first content item score is greater than one or more other content item scores of the first plurality of content item scores. Alternatively and/or additionally, the first content item 546 may be selected from the first plurality of content items based upon a determination that the first content item score is a highest content item score of the first plurality of content item scores.

Figure 5E:
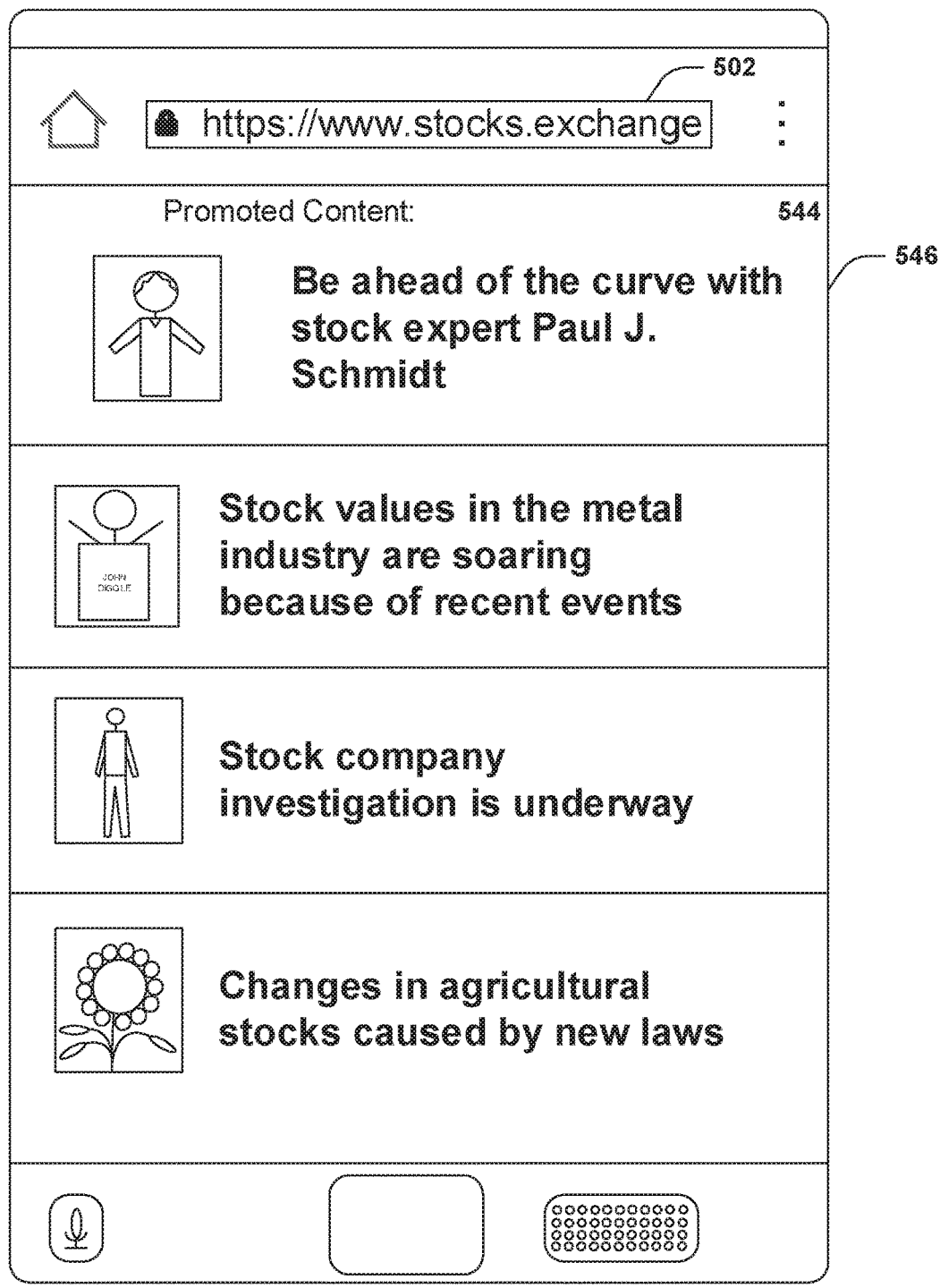
FIG. 5E is a component block diagram illustrating an example system for selecting content items for presentation via devices, where a first client device presents and/or accesses a fourth web page using a browser.

In some examples, responsive to selecting the first content item 546 for presentation via the first client device 500, the first content item 546 may be transmitted to the first client device 500 for presentation via the fourth web page 544. FIG. 5E illustrates the first client device 500 presenting and/or accessing the fourth web page 544 using the browser. For example, the content system may provide the first content item 546 to be presented via the fourth web page 544 while the fourth web page 544 is accessed by the first client device 500.

In some examples, a first content event associated with the first client device 500 and/or the first content item 546 may be detected by determining that the first content item 546 is presented via the first client device 500. For example, a first content event indication, indicative of the first content event, may be stored responsive to determining that the first content item 546 is presented via the first client device 500. Alternatively and/or additionally, the first content event indication may be stored responsive to determining that at least a threshold proportion of the first content item 546 is presented and/or displayed via the first client device 500. Alternatively and/or additionally, the first content event indication may be stored responsive to detecting a selection of the first content item 546 via the first client device 500.

In some examples, the first content event indication may be indicative of at least one of the first content item 546 (e.g., the first content event indication may comprise a content item identifier associated with the first content item 546), a first time that the first content event occurs, a first type of client device used to present the first content item 546 (e.g., a type of client device of the first client device 500, such as a smartphone), a first platform used by the first client device 500 to access the first content item 546 (e.g., the browser of the first client device 500), the fourth web page 544 used to display the first content item 546, etc.

In some examples, a first conversion event performed by the first client device 500 may be detected. The first conversion event may be associated with a first entity associated with the first content item 546. For example, the first content item 546 may be used for promoting and/or advertising one or more products (e.g., a book) associated with the first entity. The first conversion event may correspond to a purchase of a product (e.g., the book) associated with the first entity.

Figure 5F:
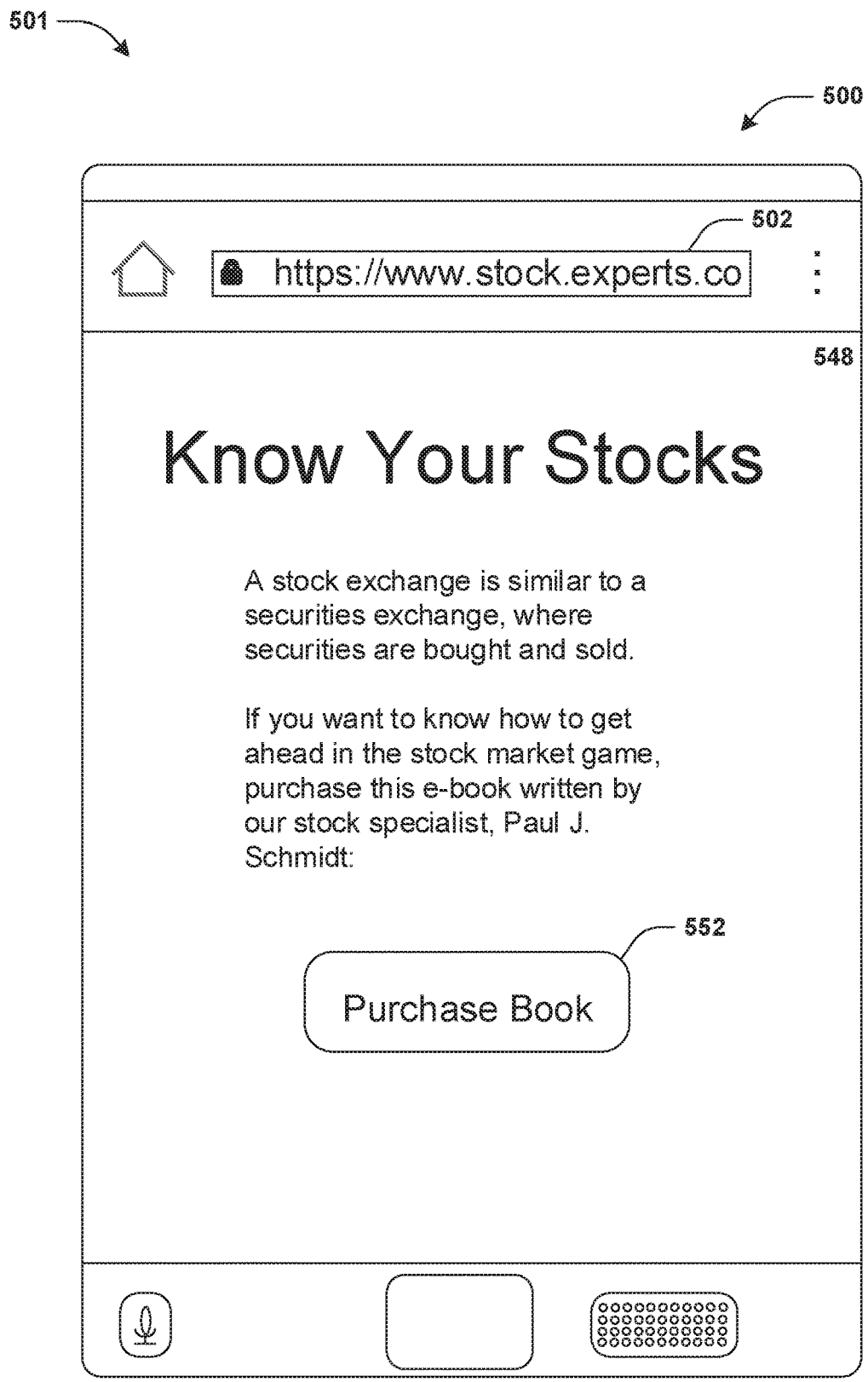
FIG. 5F is a component block diagram illustrating an example system for selecting content items for presentation via devices, where a first client device presents and/or accesses a seventh web page using a browser.

FIG. 5F illustrates the first client device 500 presenting and/or accessing a seventh web page 548 using the browser. The seventh web page 548 may be associated with the first entity. In some examples, the seventh web page 548 may comprise a third selectable input 552 associated with purchasing the product associated with the first entity. In some examples, the first conversion event may correspond to a selection of the third selectable input 552. Alternatively and/or additionally, responsive to a selection of the third selectable input 552, a payment interface may be accessed and/or displayed by the first client device 500. Payment information may be input via the payment interface. In some examples, the first conversion event may correspond to the payment information being input via the payment interface. Alternatively and/or additionally, the first conversion event may correspond to the payment information being processed and/or the purchase being completed.

In some examples, a first conversion event indication, indicative of the first conversion event, may be stored responsive to detecting the first conversion event. For example, the first conversion event indication may be stored responsive to the selection of the third selectable input 552. Alternatively and/or additionally, the first conversion event indication may be stored responsive to the payment interface being accessed and/or displayed by the first client device 500. Alternatively and/or additionally, the first conversion event indication may be stored responsive to the payment information being input via the payment interface. Alternatively and/or additionally, the first conversion event indication may be stored responsive to the payment information being processed and/or the purchase being completed. In some examples, the first conversion event indication may be indicative of the first conversion event and/or a second time that the first conversion event is performed.

Figure 5G:
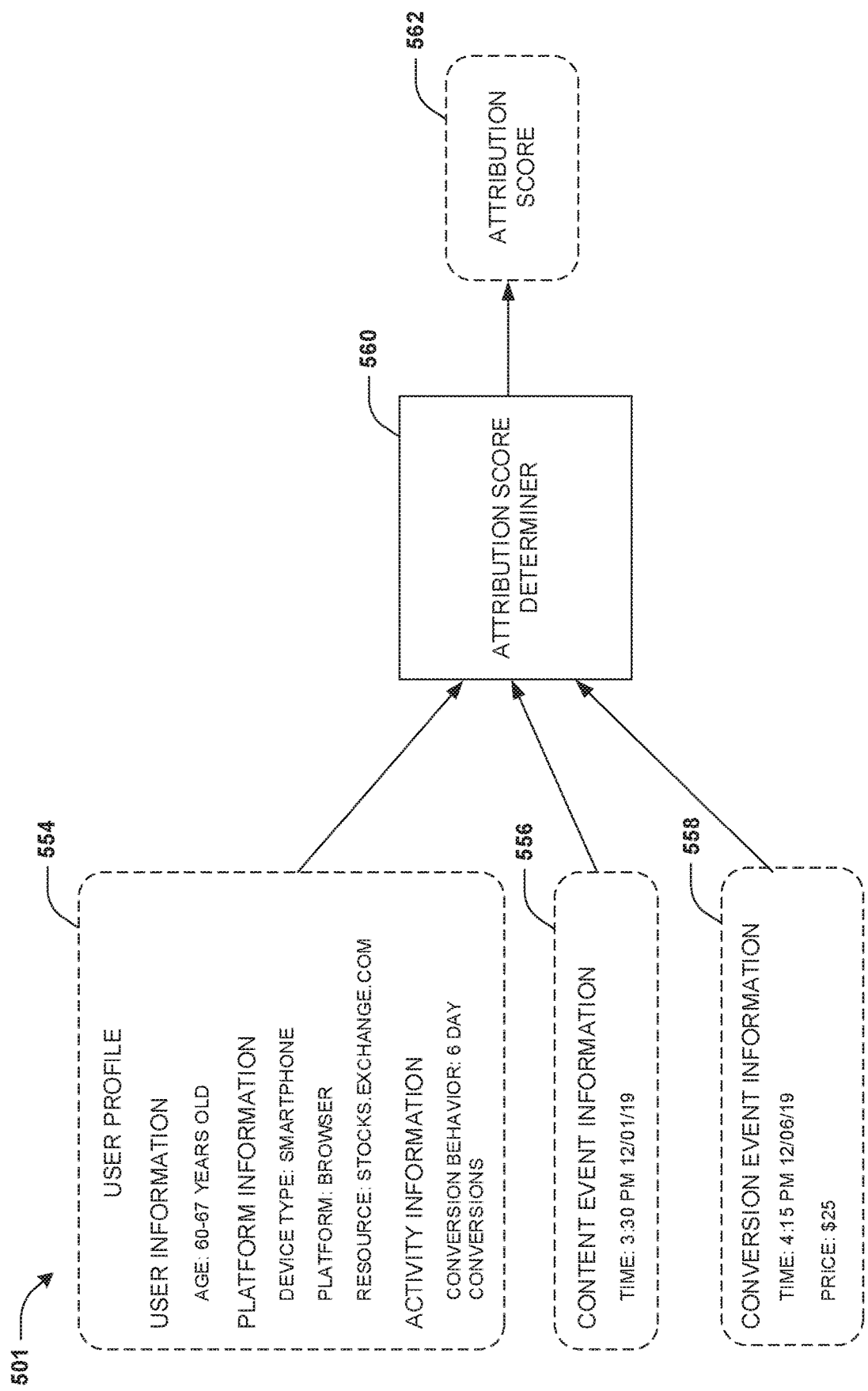
FIG. 5G is a component block diagram illustrating an example system for selecting content items for presentation via devices, where a first attribution score is determined based upon a first content event and a first conversion event.

FIG. 5G illustrates a first attribution score 562 being determined based upon the first content event and the first conversion event. In some examples, information may be input to an attribution score determiner 560. The attribution score determiner 560 may output the first attribution score 562 based upon the information using one or more of the techniques presented herein.

In some examples, a user profile database associated with the content system may comprise a first user profile 554. The first user profile 554 may be associated with the first client device 500 and/or the first user profile 554 may be associated with a first user account associated with the first client device 500. In some examples, the first user profile 554 may comprise device information associated with the first client device 500 (and/or the first user account). The device information may comprise user information comprising demographic information, such as at least one of an age (and/or an age range) of the first user, a family size associated with the first user, a gender of the first user, an occupation of the first user, an income of the first user, etc. Alternatively and/or additionally, the device information may comprise platform information associated with the content event indicative of at least one of the first type of client device used to present the first content item 546, the first platform used by the first client device 500 to access the first content item 546, the fourth web page 544 used to display the first content item 546, etc. Alternatively and/or additionally, the device information may comprise activity information, such as at least one of search history information, website browsing history, email information, selected content items, etc. In some examples, the activity information may comprise first conversion behavior information. The first conversion behavior information may be indicative of a first conversion duration of time determined based upon a plurality of content events and/or a plurality of conversion events associated with the first client device 500 (and/or the first user account). For example, the first conversion duration of time may indicate that conversion events associated with the first client device 500 are performed after about 6 days from corresponding content events (on average). In some examples, the first user profile 554 (and/or the device information of the first user profile 554) may be input to the attribution score determiner 560.

In some examples, content event information 556 may be determined. In some examples, the content event information 556 may comprise information of the content event indication stored responsive to detecting the first content event. In some examples, the content event information 556 may be indicative of at least one of the first time that the first content event occurs, the first content item 546, the first type of client device, the first platform, the fourth web page 544, etc. In some examples, the content event information 556 may be input to the attribution score determiner 560.

In some examples, conversion event information 558 may be determined. In some examples, the conversion event information 558 may comprise information of the conversion event indication stored responsive to detecting the first conversion event. In some examples, the conversion event information 558 may be indicative of the second time that the first conversion event occurs. Alternatively and/or additionally, the conversion event information 558 may be indicative of a price (and/or a price range) associated with the first content event and/or the first conversion event. In some examples, the conversion event information 558 may be input to the attribution score determiner 560.

In some examples, the attribution score determiner 560 may determine and/or output the first attribution score 562 based upon the first user profile 554, the content event information 556 and/or the conversion event information 558. For example, a first duration of time (e.g., about 5 days) between the first content event and the first conversion event may be determined based upon the first time and the second time. In some examples, the attribution score determiner 560 may determine and/or output the first attribution score 562 using one or more of the techniques presented herein, such as based upon the first duration of time, the first conversion behavior information, a comparison of the first duration of time with the first conversion duration of time, the demographic information, the first type of client device, the first platform, the fourth web page 544, the first activity information and/or other information.

In some examples, the first attribution score 562 may be stored in a first attribution data structure 576 (illustrated in FIG. 5J) associated with the first content item 546. The first attribution data structure 576 may comprise a first plurality of attribution scores associated with the first content item 546. For example, an attribution score of the first plurality of attribution scores may be associated with a content event associated with the first content item 546 and/or a conversion event associated with the first entity. In some examples, the first attribution data structure 576 may comprise indications of a first plurality of client devices and/or a first plurality of user profiles associated with the first plurality of attribution scores.

Figure 5H:
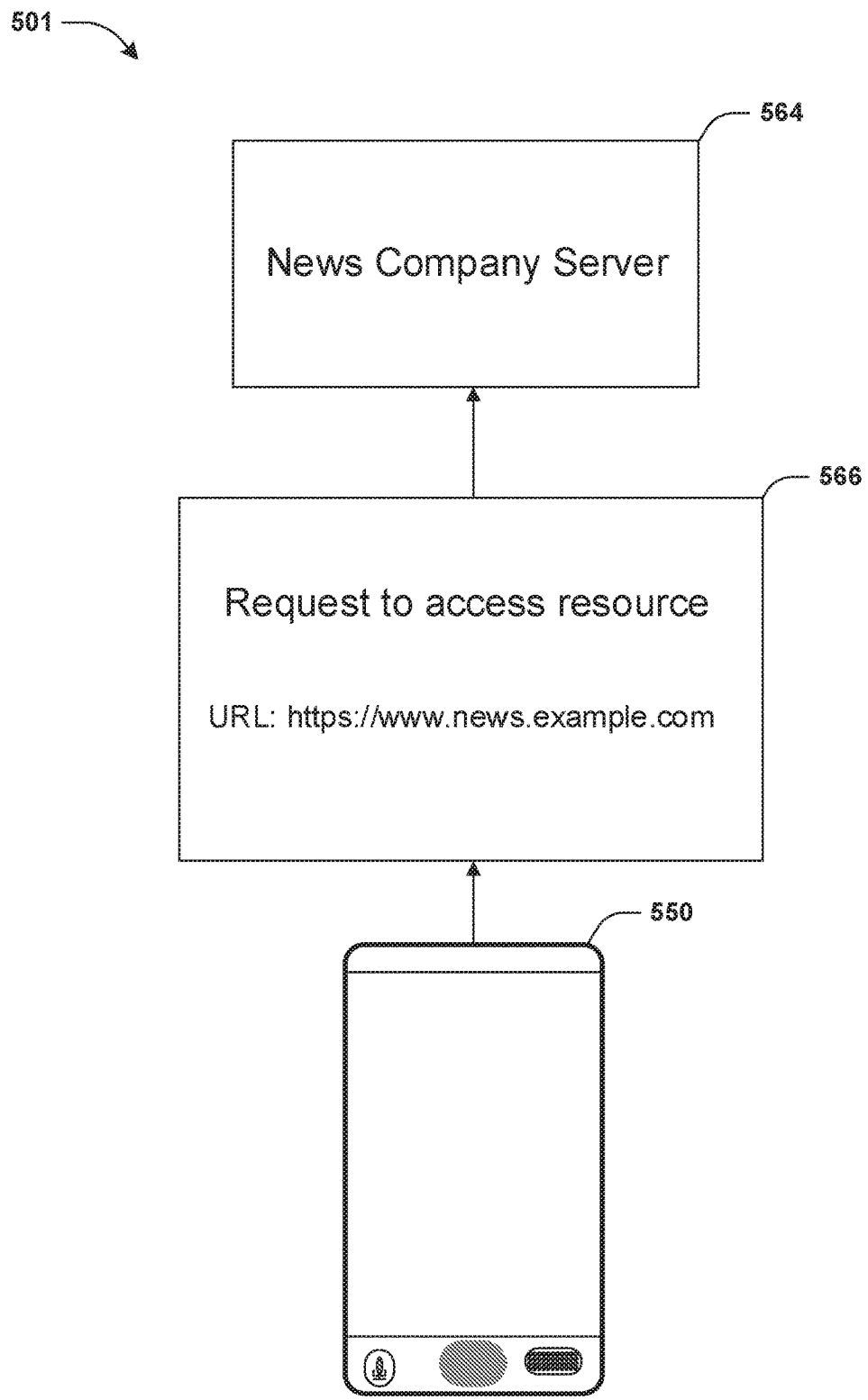
FIG. 5H is a component block diagram illustrating an example system for selecting content items for presentation via devices, where a second client device transmits a request to access a second resource to a third server.

FIG. 5H illustrates a second client device 550 transmitting a request 566 to access a second resource to a third server 564. In some examples, the second resource may correspond to an eighth web page 582 (illustrated in FIG. 5K). For example, the request 566 to access the second resource may comprise an indication of the eighth web page 582 (e.g., a web address "https://news.example.com"). Alternatively and/or additionally, the third server 564 may be associated with the eighth web page 582.

Figure 5I:
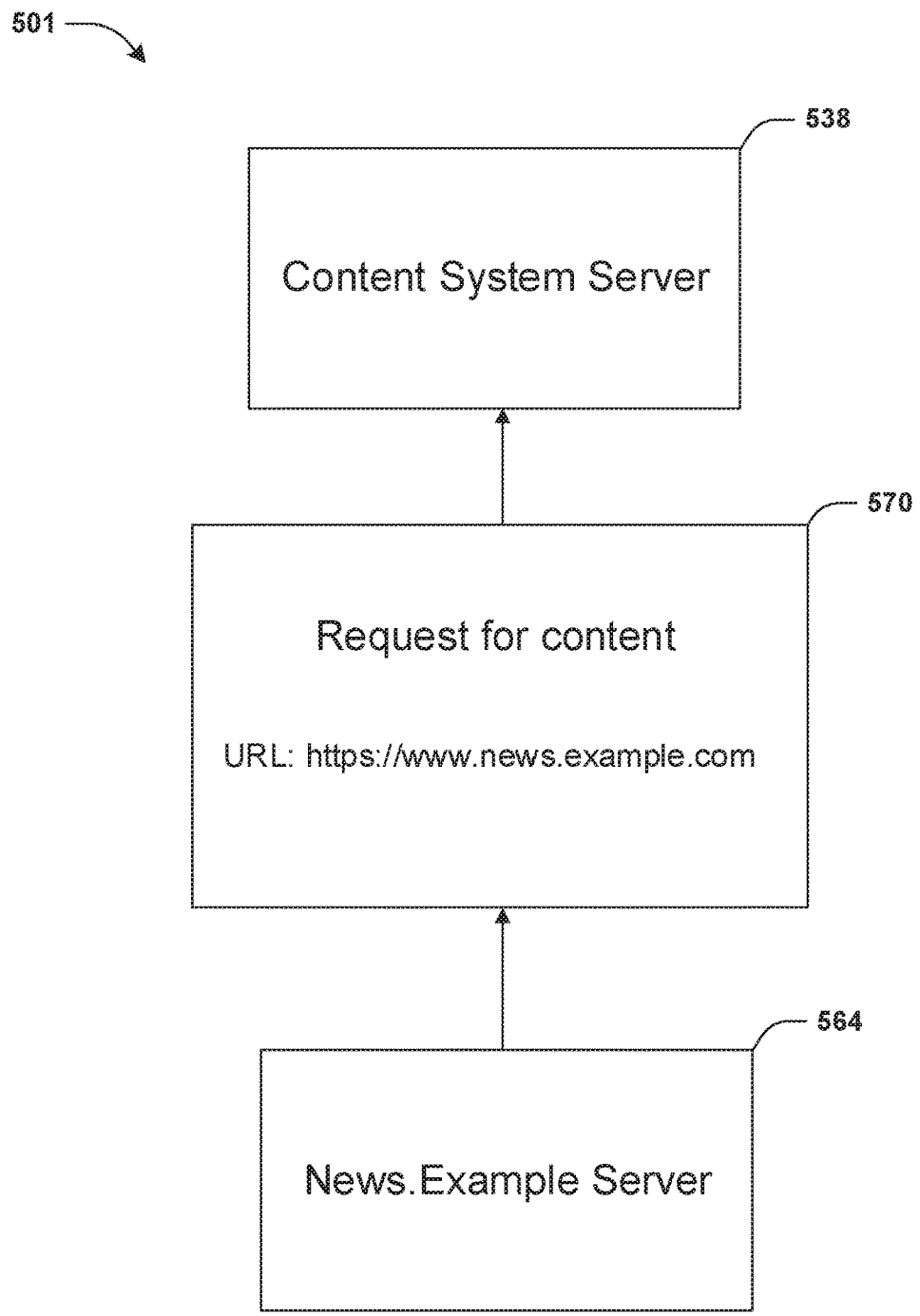
FIG. 5I is a component block diagram illustrating an example system for selecting content items for presentation via devices, where a third server transmits a second request for content to a second server associated with a content system.

FIG. 5I illustrates the third server 564 transmitting a second request for content 570 to the second server 538 associated with the content system. In some examples, the second request for content 570 may be transmitted (by the third server 564) responsive to receiving the request 566 to access the second resource. Alternatively and/or additionally, the second request for content 570 may be transmitted (to the second server 538) by the second client device 550. In some examples, the second request for content 570 may be a request to be provided with a content item (e.g., an advertisement, an image, a link, a video, etc.) for presentation via the eighth web page 582.

In some examples, responsive to receiving the second request for content 570, a bidding process may be performed to select a content item from a second plurality of content items participating in an auction (e.g., an auction for selection of a content item to present via the second client device 550). In some examples, the second plurality of content items (participating in the auction) may comprise the first content item 546.

In some examples, a second plurality of bid values associated with the second plurality of content items may be determined. In some examples, the second plurality of bid values may be determined based upon budgets (e.g., daily budgets) and/or target spend patterns associated with the second plurality of content items. In some examples, the second plurality of bid values may comprise a second bid value associated with the first content item 546.

In some examples, a first plurality of conversion scores associated with the second plurality of content items may be determined. In some examples, a conversion score of the first plurality of conversion scores may be indicative of a probability of the second client device 550 performing a conversion event associated with an entity after a content item, of the second plurality of content items, associated with the entity, is presented via the second client device 550. Alternatively and/or additionally, a conversion score of the first plurality of conversion scores may be indicative of a probability that presentation of a content item of the second plurality of content items via the second client device 550 will influence a second user associated with the second client device 550 to perform a conversion event associated with an entity associated with the content item.

In some examples, the first plurality of conversion scores may be determined based upon a plurality of attribution data structures associated with the second plurality of content items. Alternatively and/or additionally, the first plurality of conversion scores may be determined based upon a second user profile 574 (illustrated in FIG. 5J) associated with the second client device 550.

The first plurality of conversion scores may comprise a first conversion score 580 (illustrated in FIG. 5J) associated with the first content item 546. The first conversion score 580 may be indicative of a probability of the second client device 550 performing a conversion event associated with the first entity after the first content item 546 is presented via the second client device 550 (in the event that the first content item 546 is selected for presentation via the second client device 550 in the auction). Alternatively and/or additionally, the first conversion score 580 may be indicative of a probability that presentation of the first content item 546 via the second client device 550 will influence the second user associated with the second client device 550 to perform a conversion event associated with the first entity.

Figure 5J:
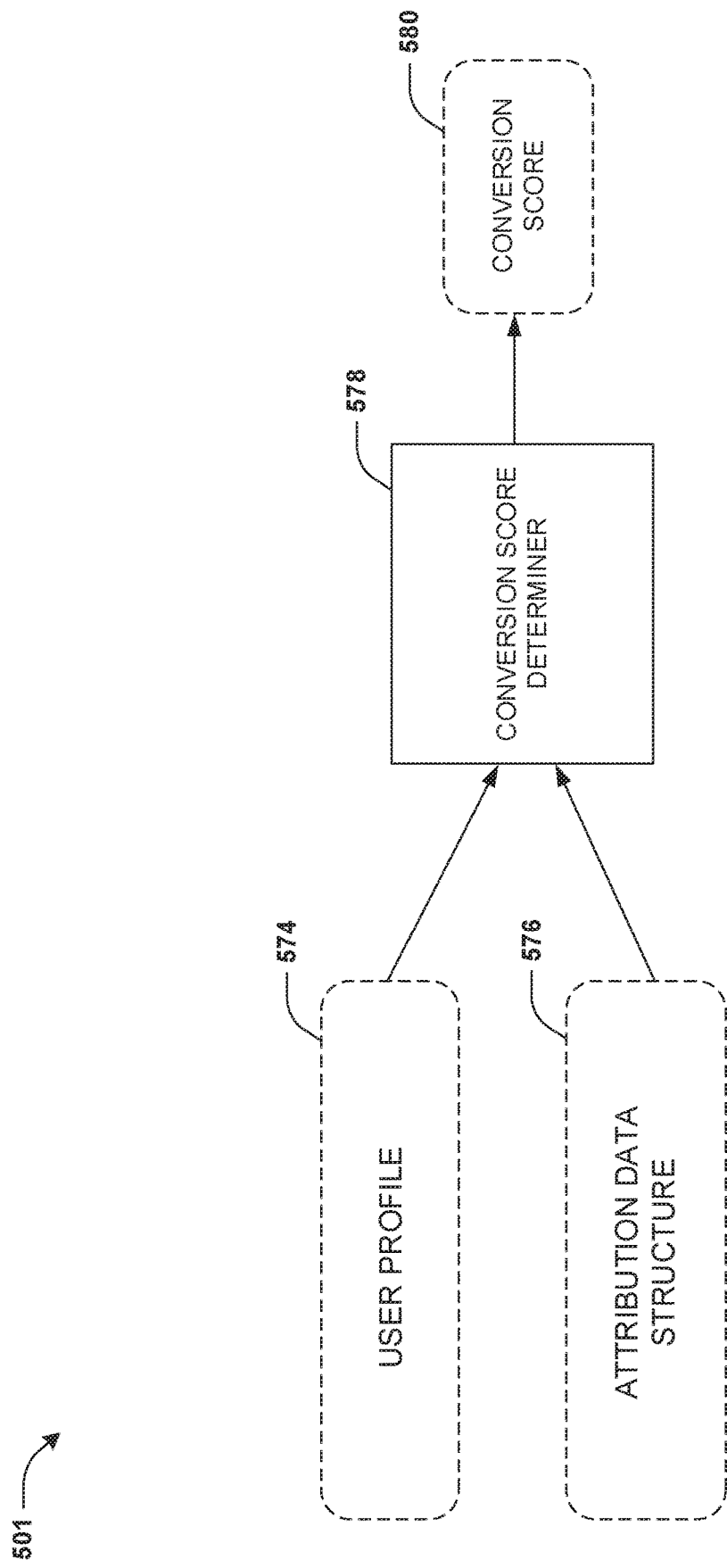
FIG. 5J is a component block diagram illustrating an example system for selecting content items for presentation via devices, where a first conversion score is determined.

FIG. 5J illustrates the first conversion score 580 being determined. In some examples, information may be input to a conversion score determiner 578. The conversion score determiner 578 may output the first conversion score 580 based upon the information using one or more of the techniques presented herein.

In some examples, the second user profile 574 associated with the second client device 550 may be input to the conversion score determiner 578. Alternatively and/or additionally, the first attribution data structure 576 may be input to the conversion score determiner 578. In some examples, the conversion score determiner 578 may determine and/or output the first conversion score 580 based upon the second user profile 574, the first attribution data structure 576 and/or other information. For example, the first conversion score 580 may be determined based upon the first plurality of attribution scores of the first attribution data structure 576, the first plurality of user profiles indicated by the first attribution data structure 576 and/or the second user profile 574. For example, the first plurality of attribution scores and/or the first plurality of user profiles may be analyzed based upon the second user profile 574 using one or more of the techniques presented herein to determine and/or output the first conversion score 580.

In some examples, the first content item 546 may be selected from the second plurality of content items based upon the first plurality of conversion scores associated with the second plurality of content items. For example, the first content item 546 may be selected from the second plurality of content items based upon a determination that the first conversion score 580 associated with the first content item 546 exceeds a threshold conversion score. Alternatively and/or additionally, the first content item 546 may be selected from the second plurality of content items based upon a determination that the first conversion score 580 is greater than one or more other conversion scores of the first plurality of conversion scores. Alternatively and/or additionally, the first content item 546 may be selected from the second plurality of content items based upon a determination that the first conversion score 580 is a highest conversion score of the first plurality of conversion scores.

Figure 5K:
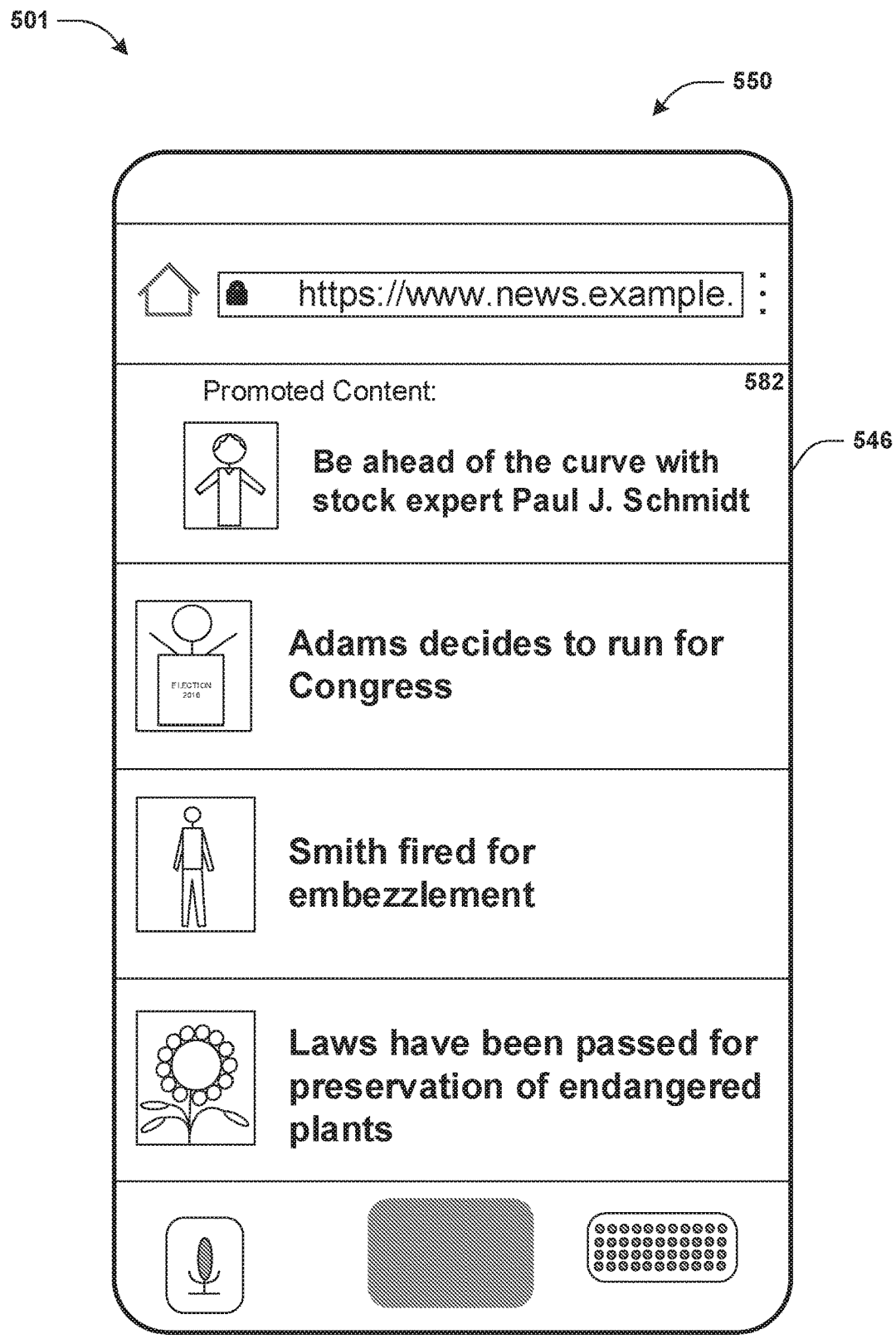
FIG. 5K is a component block diagram illustrating an example system for selecting content items for presentation via devices, where a second client device presents and/or accesses an eighth web page using a browser of the second client device.

In some examples, responsive to selecting the first content item 546 for presentation via the second client device 550, the first content item 546 may be transmitted to the second client device 550 for presentation via the eighth web page 582. FIG. 5K illustrates the second client device 550 presenting and/or accessing the eighth web page 582 using a browser of the second client device 550. For example, the content system may provide the first content item 546 to be presented via the eighth web page 582 while the eighth web page 582 is accessed by the second client device 550.

It may be appreciated that the disclosed subject matter may assist a user (and/or a client device associated with the user) in viewing and/or consuming content associated with subject matter that the user has an interest in.

Implementation of at least some of the disclosed subject matter may lead to benefits including, but not limited to, a more accurate determination of attribution scores (e.g., as a result of determining attribution scores based upon at least one of a duration of time between a content event and a conversion event, a content item category associated with the content event, an entity category associated with the content event, a price range associated with the content event, a platform with which the content event is performed, a type of device used to perform the content event, conversion behavior associated with a user, one or more demographics of the user, etc.).

Alternatively and/or additionally, implementation of the disclosed subject matter may lead to benefits including an increase in generalized revenue for presenting content items via client devices (e.g., as a result of determining attribution scores associated with content items, as a result of determining conversion scores based upon the attribution scores, as a result of selecting content items for presentation via client devices based upon the conversion scores, etc.).

Alternatively and/or additionally, implementation of at least some of the disclosed subject matter may lead to benefits including a more accurate and precise control of transmission of content items to intended users (e.g., as a result of determining attribution scores based upon a duration of time between a content event and a conversion event, a content item category associated with the content event, an entity category associated with the content event, a price range associated with the content event, a platform with which the content event is performed, a type of device used to perform the content event, user behavior associated with a user and/or one or more demographics of the user, as a result of determining conversion scores based upon the attribution scores, as a result of selecting content items for presentation via client devices based upon the attribution scores, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
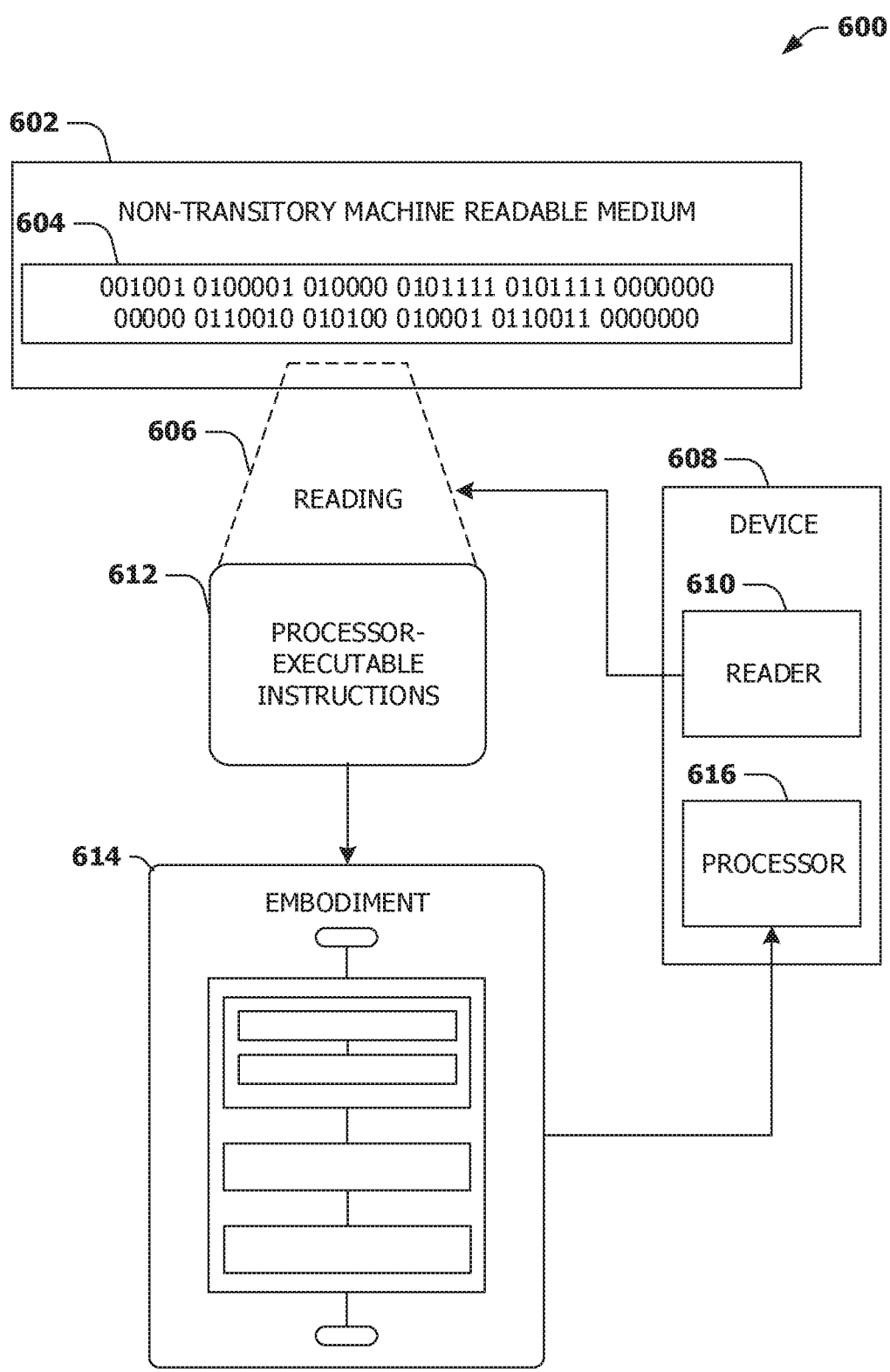
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5K, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
 detecting a first content event, associated with a first content item, performed by a first client device, wherein the first content item is associated with a first entity;

detecting a first conversion event, performed by the first client device, associated with the first entity;

determining, based upon the first content event and the first conversion event, a first duration of time between the first content event and the first conversion event;

determining, based upon the first duration of time, a first attribution score;

storing a first plurality of attribution scores, comprising the first attribution score, in a first attribution data structure associated with the first content item, wherein an attribution score of the first plurality of attribution scores is associated with a content event associated with the first content item and a conversion event associated with the first entity;

receiving a first request for content associated with a second client device;

responsive to receiving the first request for content, selecting, based upon the first attribution data structure comprising the first attribution score determined based upon the first duration of time between the first content event and the first conversion event, the first content item from a first plurality of content items for presentation via the second client device, wherein the selecting is performed based upon a determination that a first content item score associated with the first content item is higher than other content item scores of a first plurality of content item scores associated with the first plurality of content items; and transmitting the first content item to the second client device.

2. The method of claim 1, wherein:
the detecting the first content event comprises determining that the first content item is presented via the first client device.

3. The method of claim 1, comprising:
presenting the first content item via the first client device, wherein the detecting the first content event comprises detecting a selection of the first content item via the first client device.

4. The method of claim 1, comprising:
determining first content information associated with the first content item, wherein the determining the first attribution score is performed based upon the first content information.

5. The method of claim 1, comprising:
determining first device information associated with the first client device, wherein:
the first device information comprises at least one of:
user information associated with the first client device;
historical activity information associated with the first client device;
a type of client device of the first client device; or
a platform used by the first client device to access the first content item; and
the determining the first attribution score is performed based upon the first device information.

6. The method of claim 1, comprising:
determining first conversion identification information associated with the first entity, wherein:
the first conversion identification information is indicative of one or more first actions corresponding to an occurrence of at least one conversion event associated with the first entity; and
the detecting the first conversion event comprises detecting one or more second actions, performed by the first client device, matching the one or more first actions of the first conversion identification information.

7. The method of claim 1, comprising:
determining a first plurality of bid values associated with the first plurality of content items, wherein the first plurality of bid values comprises a first bid value associated with the first content item; and
determining, based upon the first attribution data structure and the first bid value, the first content item score, of the first plurality of content item scores associated with the first plurality of content items, associated with the first content item, wherein the selecting the first content item from the first plurality of content items is performed based upon the first content item score.

8. The method of claim 7, wherein:
the first plurality of attribution scores is associated with a first plurality of client devices, the method comprising:
determining a first conversion score associated with the second client device and the first content item based upon the first plurality of attribution scores, a first plurality of sets of device information associated with the first plurality of client devices and first device information associated with the second client device, wherein:
the first conversion score is indicative of a probability of the second client device performing a second conversion event after presenting the first content item via the second client device; and
the determining the first content item score of the first plurality of content item scores is performed based upon the first conversion score.

9. The method of claim 7, wherein:
wherein the determination that the first content item score associated with the first content item is higher than the other content item scores of the first plurality of content item scores is made based upon an analysis of the first plurality of content item scores associated with the first plurality of content items.

10. The method of claim 1, wherein:
the first plurality of attribution scores is associated with a first plurality of client devices, the method comprising:
determining a first conversion score associated with the second client device and the first content item based upon the first plurality of attribution scores, a first plurality of sets of device information associated with the first plurality of client devices and first device information associated with the second client device, wherein:
the first conversion score is indicative of a probability of the second client device performing a second conversion event after presenting the first content item via the second client device; and
the selecting the first content item from the first plurality of content items is performed based upon the first conversion score.

11. A computing device comprising:
a processor; and
memory comprising processor-executable instructions that when executed by the processor cause performance of operations, the operations comprising:
detecting a first content event, associated with a first content item, performed by a first client device associated with a first user profile, wherein the first content item is associated with a first entity;

detecting a first conversion event, associated with the first entity, performed by a second client device associated with the first user profile;

determining, based upon the first content event and the first conversion event, a first duration of time between the first content event and the first conversion event;

determining, based upon the first duration of time, a first attribution score associated with the first content event;

storing a first plurality of attribution scores, comprising the first attribution score, in a first attribution data structure associated with the first content item, wherein an attribution score of the first plurality of attribution scores is associated with a content event associated with the first content item and a conversion event associated with the first entity;

receiving a first request for content associated with a third client device;

responsive to receiving the first request for content, selecting, based upon the first attribution data structure comprising the first attribution score determined based upon the first duration of time between the first content event and the first conversion event, the first content item from a first plurality of content items for presentation via the third client device, wherein the selecting is performed based upon a first conversion score indicative of a probability of the second client device performing a second conversion event after presenting the first content item via the second client device; and transmitting the first content item to the third client device.

12. The computing device of claim 11, wherein:

the detecting the first content event comprises determining that the first content item is presented via the first client device.

13. The computing device of claim 11, the operations comprising:

presenting the first content item via the first client device, wherein the detecting the first content event comprises detecting a selection of the first content item via the first client device.

14. The computing device of claim 11, the operations comprising:

determining first content information associated with the first content item, wherein the determining the first attribution score is performed based upon the first content information.

15. The computing device of claim 11, the operations comprising:

determining first device information associated with the first client device and the second client device, wherein:

the first device information comprises at least one of:

user information associated with the first client device and the second client device, wherein the determining the first device information comprises analyzing the first user profile to determine the user information;

historical activity information associated with the first client device and the second client device, wherein the determining the first device information comprises analyzing the first user profile to determine the historical activity information;

a type of client device of the first client device; or a platform used by the first client device to access the first content item; and the determining the first attribution score is performed based upon the first device information.

16. A non-transitory machine readable medium having stored thereon processor-executable instructions that when executed cause performance of operations, the operations comprising:

detecting a first content event, associated with a first content item, performed by a first client device, wherein the first content item is associated with a first entity;

detecting a first conversion event, performed by the first client device, associated with the first entity;

determining, based upon the first content event and the first conversion event, a first duration of time between the first content event and the first conversion event;

determining, based upon the first duration of time, a first attribution score associated with the first content event;

storing a first plurality of attribution scores, comprising the first attribution score, in a first attribution data structure associated with the first content item, wherein an attribution score of the first plurality of attribution scores is associated with a content event associated with the first content item and a conversion event associated with the first entity;

receiving a first request for content associated with a second client device;

determining a first plurality of bid values associated with a first plurality of content items, wherein the first plurality of bid values comprises a first bid value associated with the first content item;

determining, based upon the first attribution data structure and the first bid value, a first content item score, of a first plurality of content item scores associated with the first plurality of content items, associated with the first content item;

responsive to receiving the first request for content, selecting, based upon the first attribution data structure comprising the first attribution score determined based upon the first duration of time between the first content event and the first conversion event, the first content item from the first plurality of content items for presentation via the second client device; and transmitting the first content item to the second client device, wherein at least one of:

the first plurality of attribution scores is associated with a first plurality of client devices and the operations comprise:

determining a first conversion score associated with the second client device and the first content item based upon the first plurality of attribution scores, a first plurality of sets of device information associated with the first plurality of client devices and first device information associated with the second client device, wherein:

the first conversion score is indicative of a probability of the second client device performing a second conversion event after presenting the first content item via the second client device; and the determining the first content item score of the first plurality of content item scores is performed based upon the first conversion score; or the selecting the first content item from the first plurality of content items is performed responsive to analyzing the first plurality of content item scores associated with the first plurality of content items to determine that the first content item score associated with the first content item is higher than other content item scores of the first plurality of content item scores.

17. The non-transitory machine readable medium of claim 16, wherein:
the detecting the first content event comprises determining that the first content item is presented via the first client device.

18. The non-transitory machine readable medium of claim 16, the operations comprising:
presenting the first content item via the first client device, wherein the detecting the first content event comprises detecting a selection of the first content item via the first client device.

19. The non-transitory machine readable medium of claim 16, the operations comprising:
determining first content information associated with the first content item, wherein the determining the first attribution score is performed based upon the first content information.

20. The non-transitory machine readable medium of claim 16, the operations comprising:
determining first device information associated with the first client device, wherein:
the first device information comprises at least one of:
user information associated with the first client device;
historical activity information associated with the first client device;
a type of client device of the first client device; or
a platform used by the first client device to access the first content item; and
the determining the first attribution score is performed based upon the first device information.

* * * * *